United States Patent
DeVries

(10) Patent No.: US 10,776,566 B2
(45) Date of Patent: Sep. 15, 2020

(54) SYSTEM AND METHOD OF DOCUMENT GENERATION

(71) Applicant: Nathan J. DeVries, East Grand Rapids, MI (US)

(72) Inventor: Nathan J. DeVries, East Grand Rapids, MI (US)

( * ) Notice: Subject to any disclaimer, the term of this patent is extended or adjusted under 35 U.S.C. 154(b) by 119 days.

(21) Appl. No.: 15/987,103

(22) Filed: May 23, 2018

(65) Prior Publication Data

US 2018/0341630 A1    Nov. 29, 2018

Related U.S. Application Data

(60) Provisional application No. 62/510,436, filed on May 24, 2017.

(51) Int. Cl.

| G06F 17/22 | (2006.01) |
|---|---|
| G06F 40/14 | (2020.01) |
| G06Q 50/18 | (2012.01) |
| G06F 16/93 | (2019.01) |
| G06F 40/131 | (2020.01) |
| G06F 40/166 | (2020.01) |
| G06F 40/268 | (2020.01) |
| G06F 40/284 | (2020.01) |
| G06F 40/289 | (2020.01) |

(52) U.S. Cl.
CPC .............. *G06F 40/14* (2020.01); *G06F 16/93* (2019.01); *G06F 40/131* (2020.01); *G06F 40/166* (2020.01); *G06F 40/268* (2020.01); *G06F 40/284* (2020.01); *G06F 40/289* (2020.01); *G06Q 50/184* (2013.01); *G06F 2216/11* (2013.01)

(58) Field of Classification Search
CPC ............. G06F 17/2755; G06F 17/2247; G06F 2216/11; G06F 16/93; G06F 17/2229; G06F 17/24; G06F 17/2775; G06F 17/277; G06F 40/284; G06F 40/166; G06F 40/289; G06F 40/268; G06F 40/131; G06F 40/14; G06Q 50/184
See application file for complete search history.

(56) References Cited

U.S. PATENT DOCUMENTS 8,051,187 B2 * 11/2011 Noy .................. H04L 43/026
                                                          709/229
8,515,957 B2 *  8/2013 Knight ................ G06N 5/02
                                                          707/737

(Continued)

OTHER PUBLICATIONS

Efficient Estimation of Word Representations in Vector Space, Tomas Mikolov et al, Sep. 7, 2013, pp. 1-12.

(Continued)

*Primary Examiner* — Maikhanh Nguyen
(74) *Attorney, Agent, or Firm* — Warner Norcross + Judd LLP

(57) ABSTRACT

A document generation system to generate a document that forms the basis for a patent application to be submitted for examination by a patent searching authority. The document generation system may include: 1) a model generator trained on a plurality of references obtained from a reference database and 2) a document generator configured to generate paragraphs of a document based on a trained model.

17 Claims, 22 Drawing Sheets

(56) References Cited

U.S. PATENT DOCUMENTS

| | | | |
|---|---|---|---|
| 8,996,350 B1* | 3/2015 | Dub | G06F 16/285 |
| | | | 704/1 |
| 9,418,083 B2* | 8/2016 | Pedersen | G06Q 50/184 |
| 10,216,715 B2* | 2/2019 | Broderick | G06F 17/24 |
| 10,417,341 B2 | 9/2019 | Schick et al. | |
| 10,467,122 B1* | 11/2019 | Doyle | G06F 11/3672 |
| 2008/0086432 A1* | 4/2008 | Schmidtler | G06N 20/00 |
| | | | 706/12 |
| 2010/0161830 A1* | 6/2010 | Noy | H04L 43/026 |
| | | | 709/234 |
| 2011/0029536 A1* | 2/2011 | Knight | G06N 5/02 |
| | | | 707/740 |
| 2017/0039176 A1* | 2/2017 | Broderick | G06F 17/24 |
| 2017/0046393 A1* | 2/2017 | Pedersen | G06Q 50/184 |

OTHER PUBLICATIONS

Generating Sentences from Semantic Vector Space Representations, Mohit Iyyer et al, 2014, pp. 1-5.

LSTM Char-rnn, https://github.com/fchollet/keras/blob/master/examples/lstm_text_generation.py, Jan. 22, 2017, pp. 1-3.

Char-rnn, https://github.com/karpathy/char-rnn, Jan. 22, 2017, pp. 1-6.

GloVe: Global Vectors for Word Representation, Jeffrey Pennington et al, 2014, pp. 1-12.

* cited by examiner 50 104 100 100 102 100

1. An HVAC controller configured to control one or more components of an HVAC system, the HVAC controller comprising:

a touch screen dot matrix display;

a controller in communication with the touch screen dot matrix display and configured to operate an algorithm that at least partially controls the one or more components of the HVAC system, the controller further configured to display a first image that includes a first set of information in a first display region of the touch screen dot matrix display and a second image that includes a second set of information in a second display region of the touch screen dot matrix display, the controller also configured to replace the second image in the second display region with a third image that indicates one or more system status conditions; and wherein the third image defines an information button on the touch screen dot matrix display, wherein when the information button is touched, more information is displayed on the touch screen dot matrix display that relates to the one or more system status conditions.

2. The HVAC controller of claim 1, wherein the more information is displayed, at least in part, in the first region of the touch screen dot matrix display.

3. The HVAC controller of claim 1, wherein when the information button is touched, a notification screen is displayed which provides the more information that relates to the one or more system status conditions.

Fig. 3

SYSTEM AND METHOD OF DOCUMENT GENERATION

FIELD OF INVENTION

The present application relates to a system and method for document generation, and more particularly toward generating a document based on a plurality of seed sentences.

BACKGROUND

The conventional manner in which a patent application is drafted most often involves obtaining an invention disclosure from an inventor and manually synthesizing this information into a specification, claims, and drawings. This process is laborious, often expensive, and can vary widely depending on the complexity of the disclosure materials.

Various efforts have been made to increase efficiency with respect to the drafting process. One common approach is to provide written forms for both a patent draftsman and the inventor. The written form or invention disclosure form provided to the inventor may be arranged to extract information that the inventor may not have considered, including abstractions of a specific invention to a more general description of the invention. Such a form may also provide a roadmap of sorts for the draftsman to arrange the specification and claims. Even with the help of a disclosure form, the conventional approach to drafting a patent application ultimately involves a significant amount of manual synthesize of the disclosure information by the patent draftsman and significant manual effort to author the specification and claims.

Another type of form often utilized in the drafting process is a patent template that includes several pre-written sections and headings to facilitate efficiency in drafting the application. However, similar to the shortcomings of the invention disclosure form, the actual drafting process involves significant manual effort to author the specification and claims.

SUMMARY OF THE DESCRIPTION

A system and method are provided for generating a document based on one or more seed documents, which may include text arranged according to a tree structure. A document generation system according to one embodiment may generate a document that forms the basis for a patent application to be submitted for examination by a patent searching authority. The document generation system may include: 1) a model generator for one or more models trained on a plurality of references obtained from a reference database and 2) a document generator configured to generate paragraphs of a document based on the one or more trained models.

In one embodiment, there may be a method of generating a document that forms a basis for a patent specification to be submitted for examination by a patent searching authority. The method may include providing a plurality of input statements each defining a statement group of one or more tokens, and vectorizing each of the one or more tokens to generate one or more token vectors such that each token is represented by a vector within a vector space. The method may also include generating a plurality of document tokens based on the one or more token vectors respectively representative of the one or more tokens, the plurality of document tokens forming the document to be submitted for examination by the patent searching authority.

In another embodiment, a document generation system may be provided for generating a document to be submitted for examination by a patent searching authority. The system may include a memory and a controller. The memory may store a vector space translator and one or more sequence generation models, where the vector space translator includes vector information pertaining to a vector space for tokens. The controller may be configured to receive a plurality of input statements, and programmed or configured to tokenize the plurality of input statements into one or more tokens based on content of the plurality of input statements. The controller may be configured or programmed to vectorize, based on the vector information from the vector space translator stored in the memory, each of the one or more tokens to yield a token vector within the vector space for each of the one or more tokens. The controller may be configured to arrange a sequence of vectors for each of the plurality of input statements based on the token vector for each of the one or more tokens, and to feed the sequence of vectors to the one or more sequence generation models to generate one or more output vectors. The one or more output vectors may be translated, based on the vector information, to one or more output tokens that together form the document to be submitted for examination.

In yet another embodiment, a system may be provided for generating a document to be submitted for examination by a patent searching authority, where the system includes a seed statement receiver, a vector translator, a content fragmenter, a sequence generator, and a document compiler. The seed statement receiver may be configured to receive an incoming statement with one or more tokens. The vector translator may be configured to vectorize the one or more tokens to provide one or more token vectors, and the content fragmenter may be configured to generate a plurality of seed fragments from the incoming statement. Each of the plurality of seed fragments may include at least one of the one or more token vectors.

The sequence generator may be configured to generate an output vector based on one or more input vectors. The document compiler may be configured to provide the at least one token vector from each of the plurality of seed fragments to the sequence generator and to aggregate the output vector from the sequence generator for each of the plurality of seed fragments to form an aggregate sequence, whereby the aggregate sequence forms the basis for the document to be examined.

These and other objectives, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings.

The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 3 shows a structural aspect of input text for one or more models according to one embodiment.

DESCRIPTION

Figure 1:
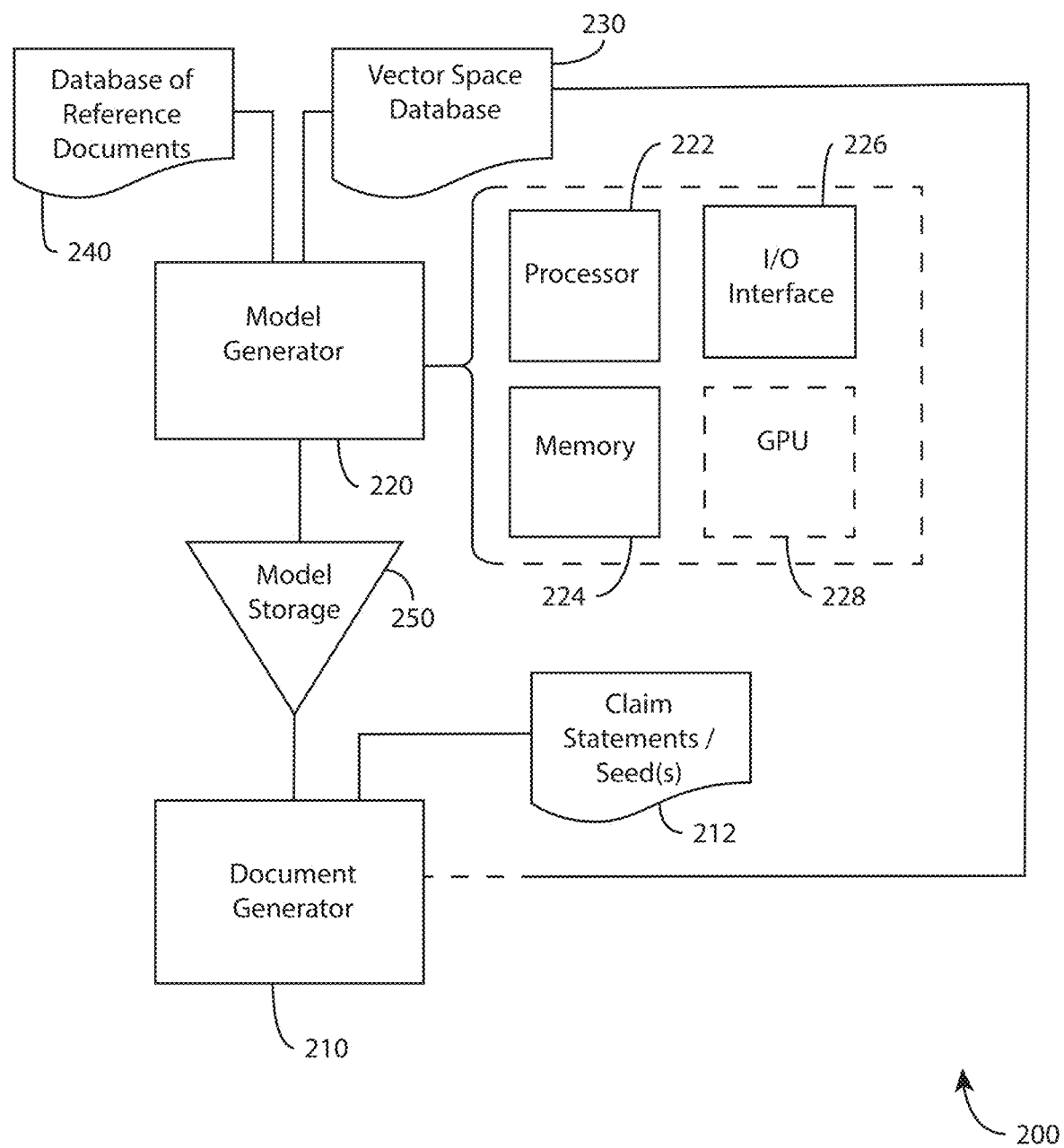
FIG. 1 shows a representative view of one embodiment according to the present disclosure.

A document generation system according to one embodiment is shown in FIG. 1 and generally designated 200. The document generation system 200 may be configured to generate a document that forms the basis for a patent application to be submitted for examination by a patent searching authority. The document generation system 200 in the illustrated embodiment is divided into two principle components: 1) a model generator 220 and 2) a document generator 210. These two components may be implemented as separate systems—although it should be understood that these two components may be implanted on the same system, or one or more aspects of one component on one system may be utilized in the other component on another system.

I. Overview

In the illustrated embodiment, the model generator 220 includes a processor 222, memory 224, and input/output interface 226. The processor 222 may be a central processing unit (CPU), such as an Intel Core i7 Processor, with a plurality of cores (physical or logical, or a combination thereof) configured to process a plurality of threads or processes simultaneously. Memory 224 may be shared on an integrated circuit associated with the processor 222, or may be separate from the integrated circuit associated with the processor 222 and in communication with the processor 222 via the input/output interface 226, or a combination thereof. Optionally, the model generator 220 may include a graphics processing unit (GPU) 228 with many more cores than the processor 222 (e.g., hundreds or thousands more) to enable parallel processing of training parameters for one or more models initialized and trained by the model generator 220. In this way, the GPU 228 may simultaneously process significantly more threads or processes than the processor 222 in training the one or more models. Use of the GPU 228 in this manner may significantly decrease the amount of training time associated with generating the one or more models.

The model generator 220 includes any and all electrical circuitry and components to carry out the functions and algorithms described herein. Generally speaking, the model generator 220 may be a controller with one or more microcontrollers, microprocessors, and/or other programmable electronics that are programmed to carry out the functions described herein. The controller may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the model generator 220, or they may reside in a common location within the model generator 220. When physically distributed, the components may communicate using any suitable serial or parallel communication protocol, such as, but not limited to, CAN, LIN, FireWire, I2C, RS-232, RS-485, and Universal Serial Bus (USB).

As described herein, the terms module, model, and generator designate parts of the controller. For instance, a model in one embodiment is described as having one or more core functions and one or more parameters that affect output of the one or more core functions. Aspects of the model may be stored in memory of the controller, and may also form part of the controller configuration such that the model is part of the controller that is configured to operate to receive and translate one or more inputs and to output one or more outputs. Likewise, a module or a generator are parts of the controller such that the controller is configured to receive an input described in conjunction with a module or generator and provide an output corresponding to an algorithm associated with the module or generator.

The document generator 210 may be configured similar to the model generator 220, and may include a processor 222, memory 224, and an input/output interface 226. The document generator 210 may optionally include a GPU 228. The document generator 210 may obtain, from model storage 250, one or more models to generate an output from an input sequence. The one or more models stored in the model storage 250 may be pre-trained by the model generator 220 such that the more intensive processing associated with training is not conducted by the document generator 210. As a result, it is possible to configure the document generator 210 with less processing power than the model generator 220. For instance, the document generator 210 may not include the GPU 228 whereas the model generator 220 may include the GPU 228. It should be understood, however, that the document generator 210 may include and utilize the GPU 228 to enhance performance speed in generating a document based on the one or more models stored in model storage 250.

With a model generator 220 configured separately from the document generator 210, one or more models may be generated ahead of time with the model generator 220, and then stored in the model storage 250 for later use with the document generator 210. The degree of processing power utilized in training the one or more models is greater than in generating an output from the one or more models after training. As a result, the model generator 220 may be configured to handle more processor intensive calculations associated with training the one or more models, leaving the less intensive calculations for the document generator 210. This way, the document generator 210 may more closely resemble a consumer level configuration without the enhanced processing capabilities utilized for the model generator 220. It should be understood however there is no requirement that the document generator 210 be less capable than the model generator 220. The document generator 210 may be substantially the same or more capable than the model generator 220.

The model storage 250 of the document generation system 200 in the illustrated embodiment may enable storage of the one or more models output by the model generator 220. Storage of a model may facilitate use of the one or more models at a later time without the need to re-initialize and re-train the model. In one embodiment, the model is based on a neural network having a model topology with a plurality of neural net nodes with weighted units. The weights of the weighted units may be initialized and trained in a variety of ways. As an example, the weights may be trained by initializing the weights, providing the model with an input and a desired output, comparing an output of the model to the desired output, and adjusting the weights to yield an output more closely resembling the desired output. Storage of the model in the model storage 250 may entail saving the model topology and the weights so that the trained model can be reproduced from the model storage 250. Additionally, or alternatively, a compiled version of the model may be stored in the model storage 250.

The model storage 250 may be non-volatile memory enabling transfer of the model storage 250 among different systems, such as from the model generator 220 to the document generator 210. In this way, one or more operational aspects of the document generation system 200 may be separated in space and time. In one embodiment, the model storage 250 may be provided as part of a software installation that includes operational aspects of the document generator 210 without one or more operational aspects of the model generator 220. It should be understood, however, that the document generation system 200 may be provided as a software installation with both the document generator 210 and the model generator 220.

In the illustrated embodiment, the document generation system 200 may include a vector database 230. The vector database 230 may be configured to translate a token to a vector in vector space. For example, a token such as "upper" may be translated to a 200 dimension vector. The dimensionality of the vectors output from the vector database 230 may vary from application to application, depending on the desired quality of the vector database 230. The vector database 230 may be generated from a large corpus of tokens with each token being assigned a vector in vector space. Examples of vector space models or databases are based on the word2vec algorithm used to produce word embeddings and the GloVe algorithm to do the same. Additional example implementations of word2vec are described in further detail in Efficient Estimation of Word Representations in Vector Space, submitted to Cornell University Library on Sep. 7, 2013, by Mikolov et al.—the disclosure of which is incorporated by reference herein in its entirety. Additional example implementations of GloVe are described in further detail in GloVe: Global Vectors for Word Representation, by Pennington et el.—the disclosure of which is incorporated by reference herein in its entirety. The vector space model may be generated in an unsupervised manner (e.g., providing an input without a target output) so that a corpus of tokens, possibly significantly large, can be processed to form the vector space translations of tokens. Examples of significantly large corpuses include the entirety of available Wikipedia articles or all or a portion of references available from one or more patent authorities, such as the database of references maintained by the U.S. Patent and Trademark Office (USPTO) including issued patents and patent application publications. The models and the vector database 230 in one embodiment may be dynamic, so that as additional technological advancements are made and token associations are created, the vector database 230 and models can adapt accordingly.

Figure 22:
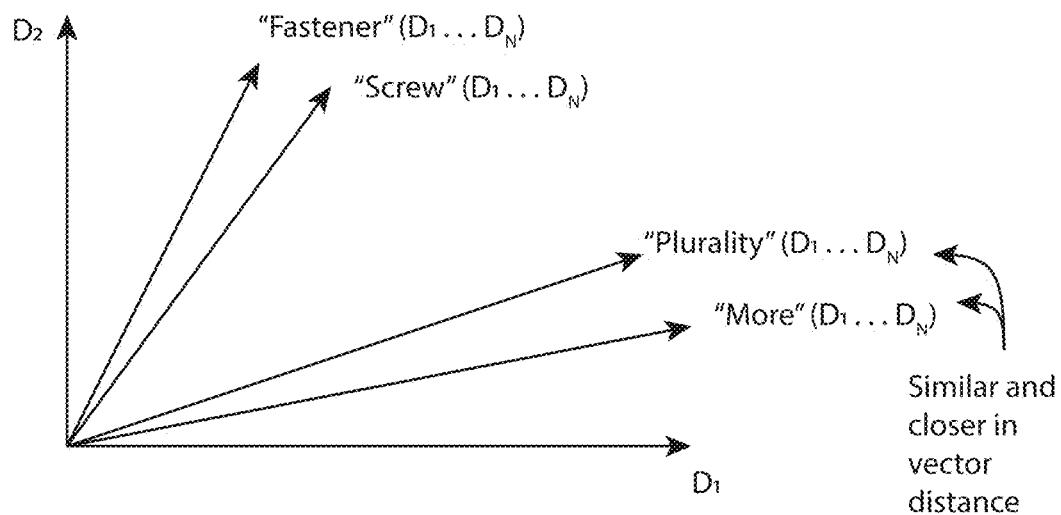
FIG. 22 shows a representative view of vector space according to one embodiment.

An example of token vectorization can be seen in the illustrated embodiment of FIG. 22. One aspect of building a vector space of tokens is that the tokens having similar meanings tend to group together within the vector space. For instance, as shown in the illustrated embodiment of FIG. 22, the terms "fastener" and "screw" are proximal to each other in the example 2-D vector space, and not proximal to the terms "plurality" and "more". The illustrated embodiment provides an example of 2-D space, but it should be understood that the dimensionality can be increased, such as to 100 dimensions or greater including greater than 1,000 dimensions.

The document generation system 200 may be communicatively coupled to a database of references or reference database 240. The reference database 240 may be similar to the corpus from which the vector database 230 is based. For instance, the reference database 240 may include all or a portion of references available from one or more patent authorities, including the database of references available from the USPTO. Additional or alternative patent authorities may be sourced for the reference database 240, such as the European Patent Office, the World Intellectual Property Office and the Japanese Patent Office. The reference database 240 is not limited to a single language, such as English. Likewise, the vector database 230 is not limited to a single language. The reference database 240 may be a source of information for each reference, including specification text and claim text. The specification text and claim text may be tagged or identified as such, respectively, for all or a majority of the references available from the reference database 240. Additional information with respect to each reference may be provided by the reference database 240, such as bibliographic information, status of an application associated with the reference, and class or technology classification information, or any combination thereof. The reference database 240 may be stored locally with respect to one or more aspects of the document generation system 200—e.g., the reference database 240 may be stored in memory 224 of the model generator 220.

In one embodiment, models may be trained for specific classes of references, such as a type of technology class associated with a plurality of references. This way, a document generator 210 may be provided for types of technology, such as biomedical or cloud data computing.

The claim text of each reference may define a plurality of statements arranged in a tree structure. For instance, the plurality of statements may include one or more head statements 50 (e.g., independent claims) and one or more child statements 60 (e.g., dependent claims) associated with or dependent on at least one of the one or more head statements 50 and the one or more child statements 60. In this way, a child statement 60 may depend on another child statement 60, which itself depends on a head statement 50 such that a child statement 60 may be considered a grandchild or further descendent of at least one of the one or more head statements 50. This tree structure of statements results in a child statement 60 incorporating all of the content of its lineage to a head statement 50. In some cases, a child statement 60 may depend on more than one statement, such as the one or more head statements 50 or the one or more child statements 60, or a combination thereof. The preamble of a head statement 50 or a preamble fragment 110 may define the general subject matter of the head statement 50 as well as any child thereof. The preamble of a child statement 60 may identify the dependency of the child statement 60, defining an association within the tree structure of the claim text.

In one embodiment of the present disclosure, as discussed in further detail herein, the claim text can be grouped or classified in a variety of ways. For instance, the text of a head statement 50 may include a plurality of noun phrases 100 or objects comprising one or more word tokens that together define an aspect or feature of the head statement 50, such as a thing, quality or action. Not all tokens of the claim text may define a noun phrase—some tokens may function differently, such as by linking two noun phrases 100 or functioning as a verb phrase.

All or portions of the head statement 50 may be grouped into a plurality of fragments—e.g., with each fragment including one or more noun phrases 100. A fragment may be defined according to one or more criteria, such as tokens or noun phrases 100 being between delimiters (e.g., ":", ";", newline markers, or a combination thereof), on the same line (e.g., between newline markers), at the beginning of a line, after the beginning of the line, in the preamble of the head statement 50 or in a "wherein" clause, or any combination thereof. As an example, a preamble fragment 110 may be identified as the preamble of the head statement 50 that precedes the token "comprising".

The specification text of each reference may include fragments or subsections that repeat or describe aspects of the claim text in further detail, including aspects associated with a fragment of the claim text. As an example, a paragraph of the specification text may utilize all or a subset of the noun phrases 100 associated with a preamble fragment 110 of a head statement 50. In one embodiment, such a paragraph of the specification may also lack all or a subset of the noun phrases 100 associated with other fragments of the head statement 50.

In the illustrated embodiment of FIG. 1, the model generator 220 may analyze the claim text and specification text for each reference selected from the reference database 240. From this analysis, the model generator 220 may generate a plurality of token sequence pairs, each including an input (a fragment of claim text) and an output (a fragment of specification text). The model generator 220, as discussed herein, may generate more than one type of model depending on the type of claim fragment being used as an input and the one or more criteria for identifying a specification fragment to associate with the claim fragment. For instance, one model type may be configured and generated for preambles, including the preamble fragment 110 of a head statement 50 and a fragment of specification text (e.g., a paragraph) that includes all noun phrases 100 of the preamble fragment 110 but no noun phrases of the head statement 50 outside the preamble fragment 110. Another model type may be generated for a base fragment 120 corresponding to the base topic noun phrases 114 that start lines in the head statement 50 but do not form part of "wherein" clauses. In one embodiment, this base fragment 120 may be associated with a fragment of specification text that includes all of the noun phrases 100 in the base fragment 120 but none or few noun phrases 100 that occur within the tokens of the base fragment 120 but after the base topic noun phrase 114.

Using the identified inputs/outputs from the analysis of references from the reference database 240, the model generator 220 may train one or more models to take as an input a seed fragment with no corresponding specification text and to generate specification text from the seed fragment. The one or more models may be stored in the model storage 250, which can be communicated to the document generator 210 for use in generating a document.

In one embodiment, a seed document 212 may be processed into one or more seed fragments similar to the fragments utilized in training the respective types of models. The document generator 210 may provide the one or more seed fragments as input to a respective model obtained from the model storage 250. The output provided from the one or more models, based on the input, may be compiled to form a document that provides a basis for a patent application to be examined by a patent searching authority. It should be understood that while the present disclosure focuses on generating a document as the basis for a patent application, the present disclosure is not so limited. The document generator may be configured to generate a document of any type, including, for example, a news article, legal opinion, manual, and a software requirements document based on a list of software requirement statements.

II. Tree Structure

As discussed herein, the plurality of statements utilized as a seed document 212 or obtained from a reference of the reference database 240 may define a tree structure including one or more head statements 50 and one or more child statements 60. An example of this tree structure is shown in the illustrated embodiments of FIGS. 3-13. It should be understood that the present disclosure may be utilized in conjunction with other types of documents arranged in a different or similar manner. For instance, the references may not define a tree structure, or may define a different type of organization, such as paragraphs arranged with a topic paragraph and subtopic paragraphs relating to aspects of the topic paragraph.

In the illustrated embodiment, it should be appreciated that the noun phrases 100 and associated descriptions may also form a tree structure. For instance, a noun phrase 100 recited in a child statement 60 may correspond to the same noun phrase 100 recited in the head statement. If the noun phrase 100 in the child statement leads to a statement fragment 102, that statement fragment 102 may be considered a leaf of the noun phrase 100 recited in the head statement 50. This type of tree structure is governed at least in part by antecedent basis rules applied in forming the head statement 50 and child statements 60.

In the illustrated embodiment of FIG. 3, a seed document 212 is depicted with various markers identifying groups of tokens or fragments. The seed document 212 includes a slash marker "/" that identifies fragment boundaries 104 and box markers to identify noun phrases 100. For purposes of disclosure the slash markers and the box markers are provided throughout portions of the illustrated embodiments without reference numbers. As can be seen, there are a variety of criteria that may be utilized in identifying a fragment boundary 104. For instance, the beginning of a claim statement preceding a number may correspond to a fragment boundary 104, the end of a paragraph or a period, comma, or semicolon followed by a newline may correspond to a fragment boundary 104. Punctuation such as a comma or semicolon without being followed by a newline may also correspond to a fragment boundary 104. Additionally or alternatively, a particular type of token, such as a "wherein" or "comprising" token, may correspond to a fragment boundary 104. These various criteria are used in identifying the fragment boundaries 104 depicted in the illustrated embodiment of FIG. 3. It should be understood that fewer or more criteria may be utilized in identifying the fragment boundaries 104.

The fragment boundaries 104 may define groups of tokens collectively defining a statement fragment 102. The tokens within each statement fragment 102 may include noun phrases 100 that function as a subject or object of the statement fragment 102. The tokens may define other phrases or grammatical functions, such as a verb phrase. In the illustrated embodiment, each of the statement fragments 102 is further defined by one or more noun phrases 100—although, in some cases, a statement fragment 102 may not include any noun phrases 100. Further defined aspects of the noun phrases 100 may be determined based on position within the statement fragment 102. For instance, a noun phrase 100 positioned at or near the start of the statement fragment 102 or the first noun phrase of the statement fragment 102 may be defined as a topic noun phrase, and a noun phrase following the topic noun phrase may be defined as a predicate noun phrase 116.

In the illustrated embodiments of FIGS. 3-13, the position or content, or both, of a statement fragment 102 relative to one or more other statement fragments 102 may be used as a basis for categorizing the statement fragment 102. The category or type of statement fragment 102 may form the criteria for training a model type or providing the statement fragment 102 as an input to the model type to generate an output.

For example, the statement fragment 102 may be provided as an input to a model type trained against training data from the reference database 240 with statement fragments 102 similarly arranged within a head statement 50 or a child statement 60 and associated with aspects of a specification that include the same or similar noun phrases as the statement fragment 102. For instance, a paragraph or portion of the specification text that utilizes one, several or all of the noun phrases 100 of the statement fragment 102 or is similar to the base fragment 120 according to a similarity metric (e.g., vector similarity with respect to tokens of the base fragment 120 and the portion of the specification text, or one or more fuzzy comparisons of one or more tokens in the base fragment 120 with the tokens of the portion being indicative that the content of the base fragment 120 is substantially included within the portion of the specification text). Similar techniques may be utilized in determining portions of the specification text to train for statement fragments 102 obtained from references of the reference database 240.

A) Preamble Fragment

Figure 4:
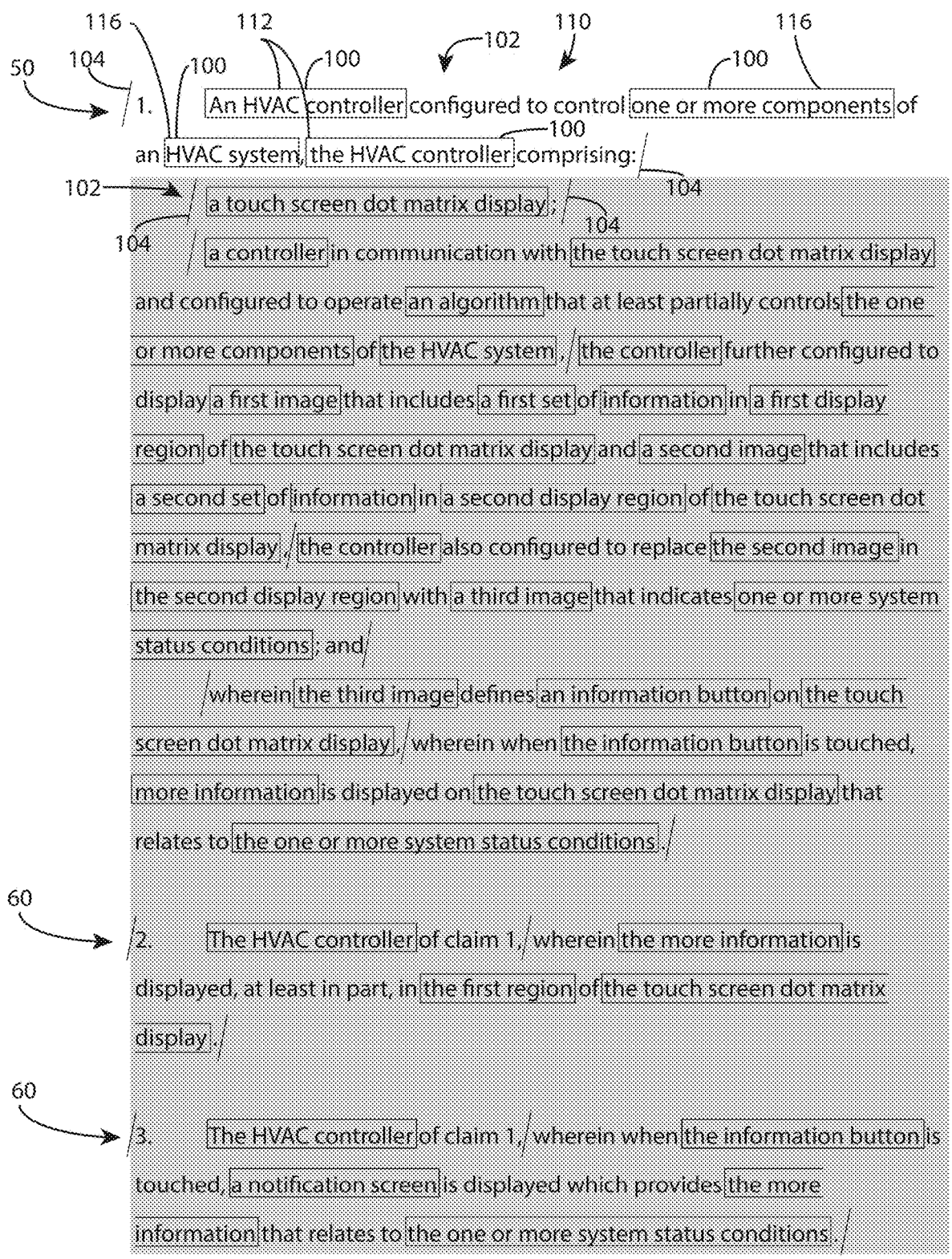
FIGS. 4-13 shows various additional structural aspects of the input text of FIG. 3.

In the illustrated embodiment of FIG. 4, one of the statement fragments 102 is shown among a plurality of statement fragments 102 with the other statement fragments 102 greyed out. The statement fragment 102 that is visible or active is part of a head statement 50, and forms the first statement fragment defined by the start of the head statement 50 and the token "comprising". This statement fragment 102 may be the preamble fragment 110 or head topic fragment.

The preamble fragment 110 as discussed herein may include a plurality of noun phrases 100. The first noun phrase of the plurality may be identified as the head topic noun phrase 112, which can provide context for all or substantially all of the tree that is defined by the head statement 50 and the child statements 60 of the head statement 50. The preamble fragment 110 may also include one or more predicate noun phrases 116 subsequent to the head topic noun phrase 112. The preamble fragment 110 may form the basis for training and generating output from a first type of model. For instance, the aspects of the preamble fragment 110 may provide a main topic of the document to be generated that can be provided to a model trained to generate one or more tokens that expand on the main topic.

B) Base Fragment

Figure 6:
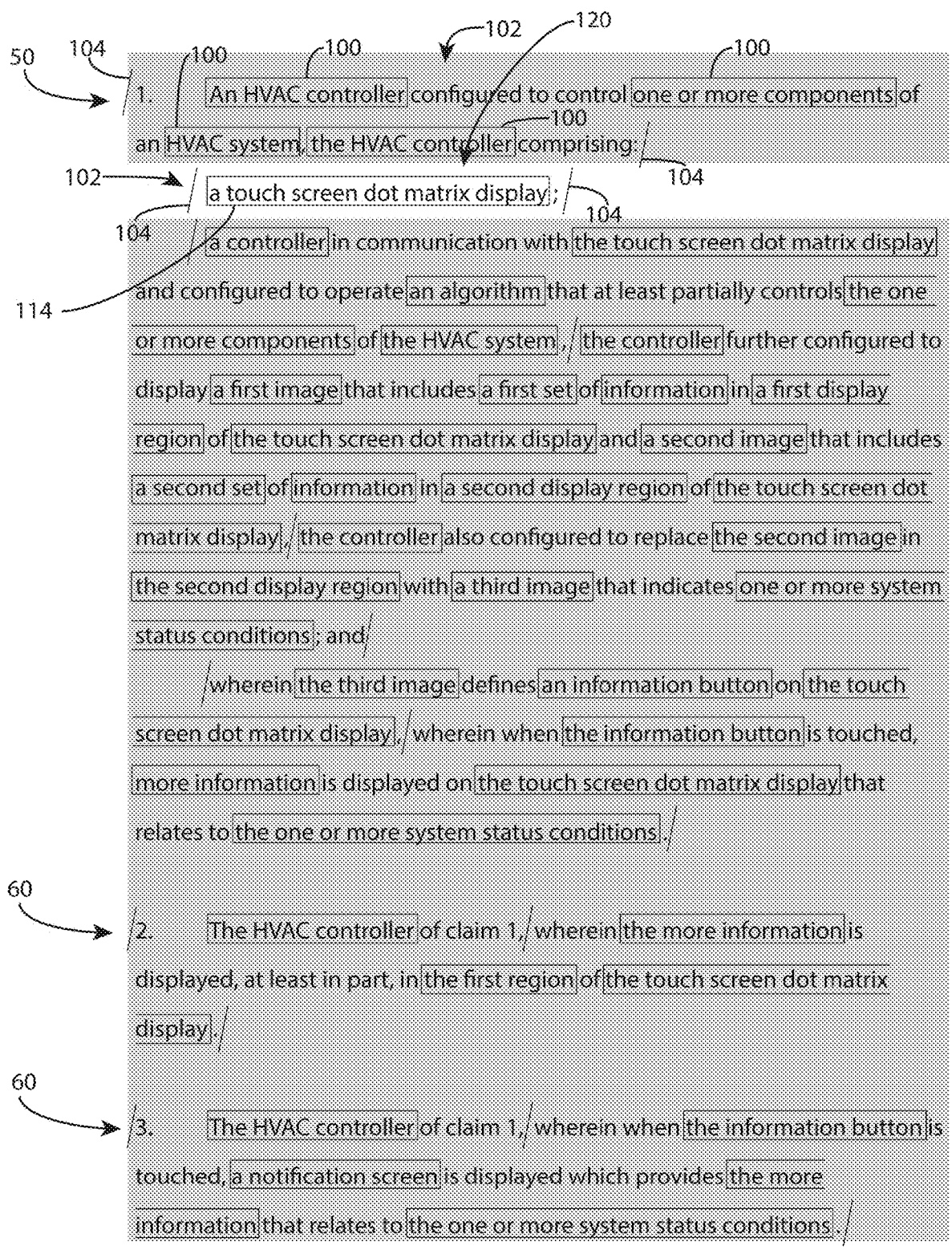
Figure 7:
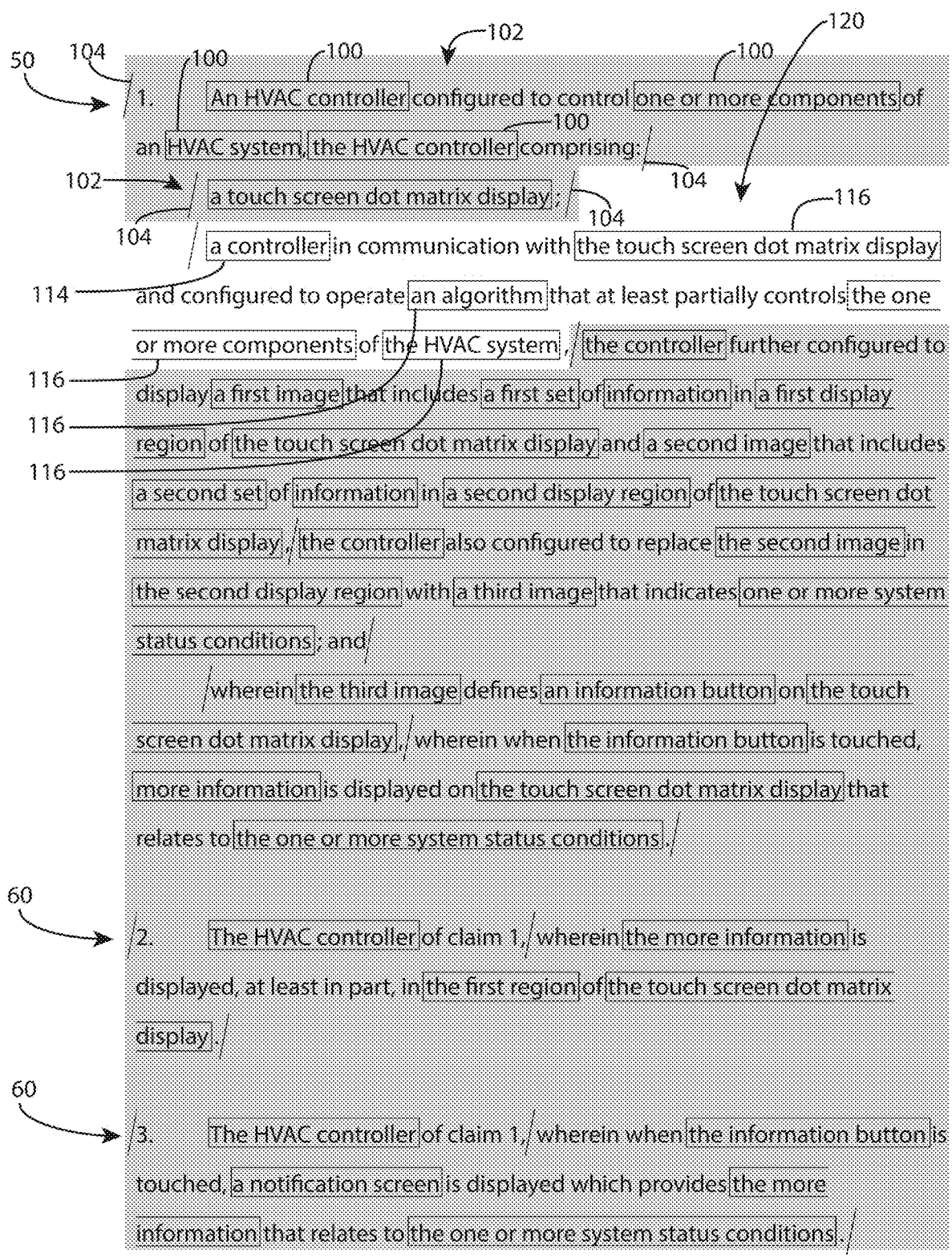
Figure 8:
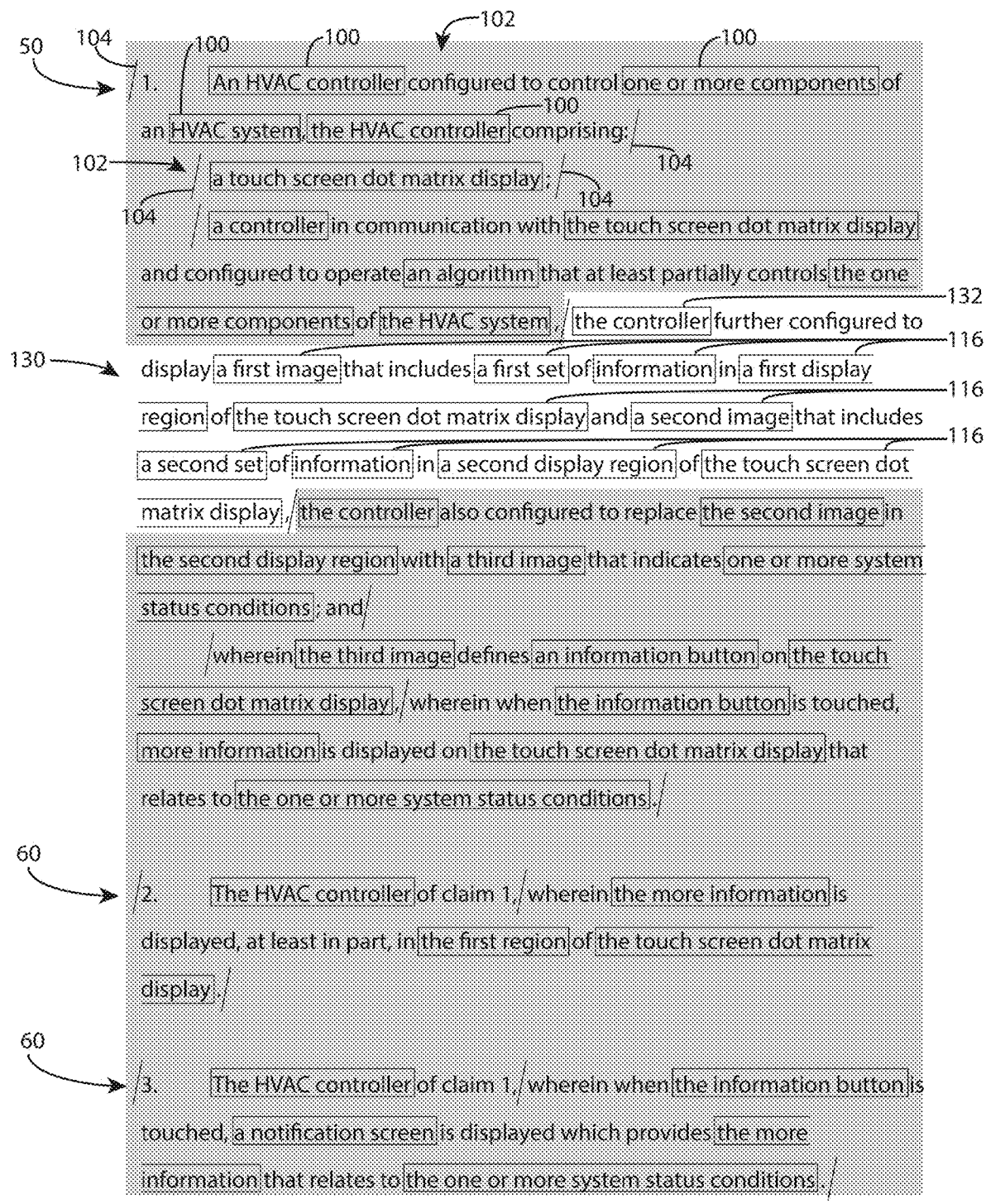
Figure 9:
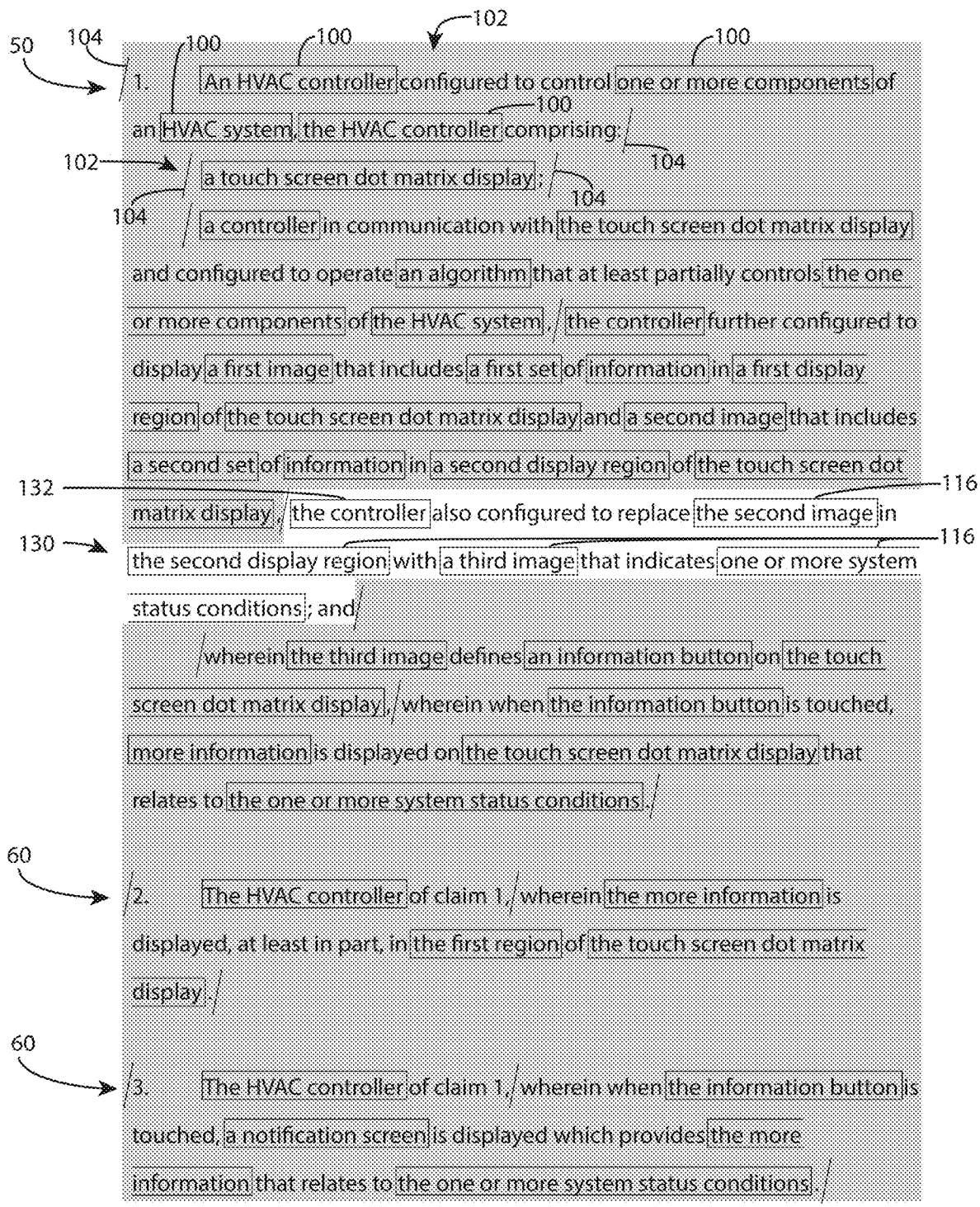

Turning to the illustrated embodiment of FIGS. 6 and 7, the statement fragment 102 shown active or without being greyed out is positioned with a fragment boundary 104 following punctuation, a newline, or the end of a paragraph, or a combination thereof. This type of statement fragment 102 may be categorized according to one or more of these or similar criteria, such as following a newline and including a base topic noun phrase 114 at the beginning of the statement fragment 102. Additionally, or alternatively, the criteria for identifying the type of statement fragment 102 depicted active in FIGS. 6 and 7 may be presence of a noun phrase 100 at the head of the statement fragment 102 that has not been used in a preceding statement fragment 102, or not used in a preceding statement fragment except the preamble fragment 110. The statement fragment 102 categorized in this manner is described herein as a base fragment 120.

The base fragment 120 may begin with a base topic noun phrase 114, and include zero or more predicate noun phrases 116 after the base topic noun phrase 114. For instance, in the illustrated embodiment of FIG. 6, the base fragment 120 includes only the base topic noun phrase "a touch screen matrix display" without one or more predicate noun phrases 116. The collection including the base topic noun phrase 114 and the zero or more predicate noun phrases 116 may provide context for aspects of the document to be generated that emphasize the base topic noun phrase 114 and possibly its relation to the zero or more predicate noun phrases 116.

C) Aggregate Fragment

Several of the statement fragments 102 described herein are defined by fragment boundaries 104. However, it should be understood that a statement fragment 102 is not so limited. The statement fragment 102 may be formed by a collection of one or more tokens of different statement fragments 102 defined by fragment boundaries 104. An example of such a statement fragment 102 is depicted in the illustrated embodiment of FIG. 5, where tokens of the statement fragment 102 are not greyed out.

Figure 5:
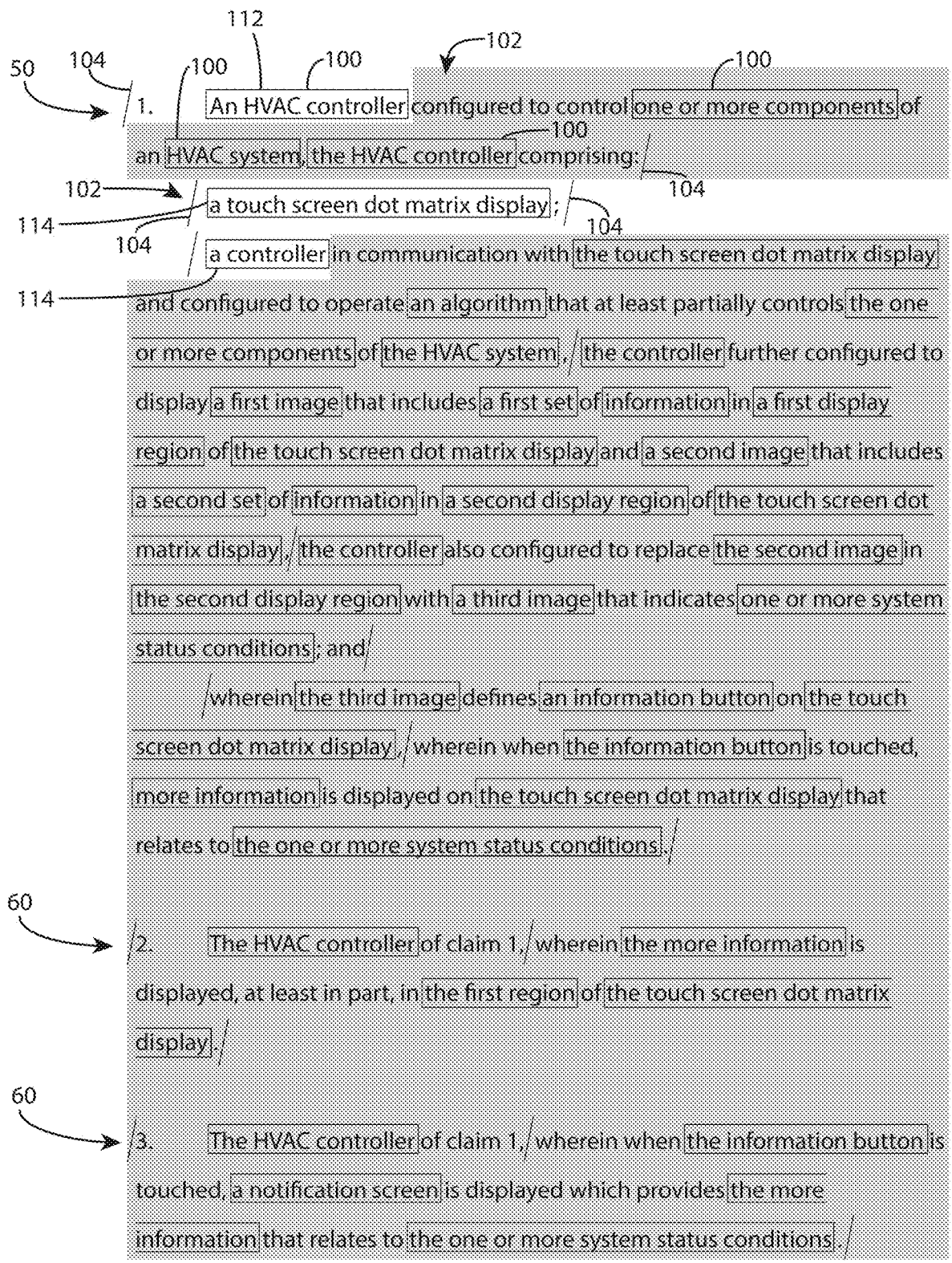

In the illustrated embodiment of FIG. 5, the statement fragment 102 is defined by a plurality of noun phrases 100, including the head topic noun phrase 112. As described herein, there may be a first noun phrase of a statement fragment 102 following a fragment boundary 104, which may follow a newline, punctuation and a newline, or the end of a paragraph. This type of noun phrase 100 is shown in the illustrated embodiment of FIG. 5 and generally described as a base topic noun phrase, designated as 114. The statement fragment 102 of the illustrated embodiment of FIG. 5 includes such a base topic noun phrase 114. The collection of tokens that define the type of statement fragment 102 in the illustrated embodiment of FIG. 5 may include other types of noun phrases 100 or groups of one or more tokens, such as a verb phrase or one or more predicate noun phrases 116.

The statement fragment 102 in the illustrated embodiment of FIG. 5 may form the basis for training and generating output from a second type of model as described herein. In other words, the second type of model may be trained based on a statement fragment 102 that is formed from all or parts of two or more other statement fragments 102, and may be configured to generate output of one or more tokens based on similar input obtained from the seed document 212.

D) Feature Fragment

In the illustrated embodiments of FIGS. 8-11, a type of statement fragment 102 described as a feature fragment 130 is shown active or without being greyed out. The criteria that primarily identifies the feature fragment 130 from other types of statement fragments 102 is the noun phrase 100 positioned at the head of the feature fragment 130 (identified as a feature topic noun phrase 132) corresponding to a noun phrase 100 recited in another statement fragment 102.

The statement fragments 102 shown active in the illustrated embodiment of FIGS. 8-11 may be identified as feature fragments 130 primarily because they may further expand on the principle concept of the feature topic noun phrase 132. This may be used as a basis for training a model type based on a plurality of feature fragments 130 and portions of specification text that are respectively similar to the plurality of feature fragments 130 according to a similarity metric. As an example, a portion of specification text may be identified based on presence of the same or similar noun phrases 100 as a feature fragment 130. Additionally, or alternatively, absence of any noun phrases 100 in the portion of specification text that are not present in the feature fragment 130 may identify the portion of specification text as a candidate for training. In yet another similarity metric, the portion of specification text may be identified based on the absence of any noun phrases 100 other than the feature topic noun phrase 132 that are present in the statement fragment 102 from which the feature fragment 130 is associated by virtue of the feature topic noun phrase 132.

Examples of a feature topic noun phrase 132 are outlined in the illustrated embodiments of FIGS. 8-11. In the illustrated embodiment of FIG. 8, the feature fragment 130 includes a feature topic noun phrase 132 that is the same as the base topic noun phrase 114 of the base fragment 120 preceding the feature fragment 130.

Figure 10:
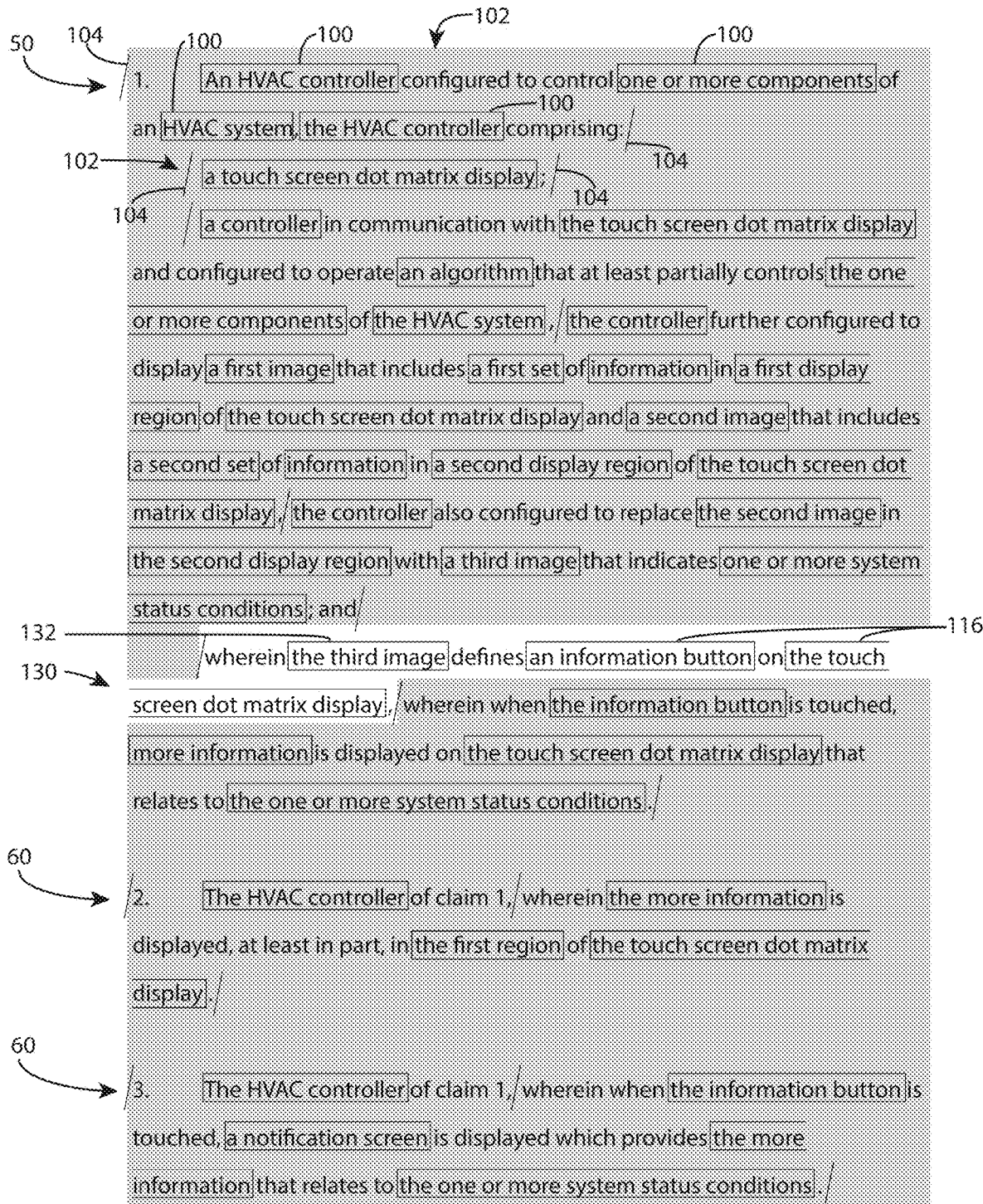
Figure 11:
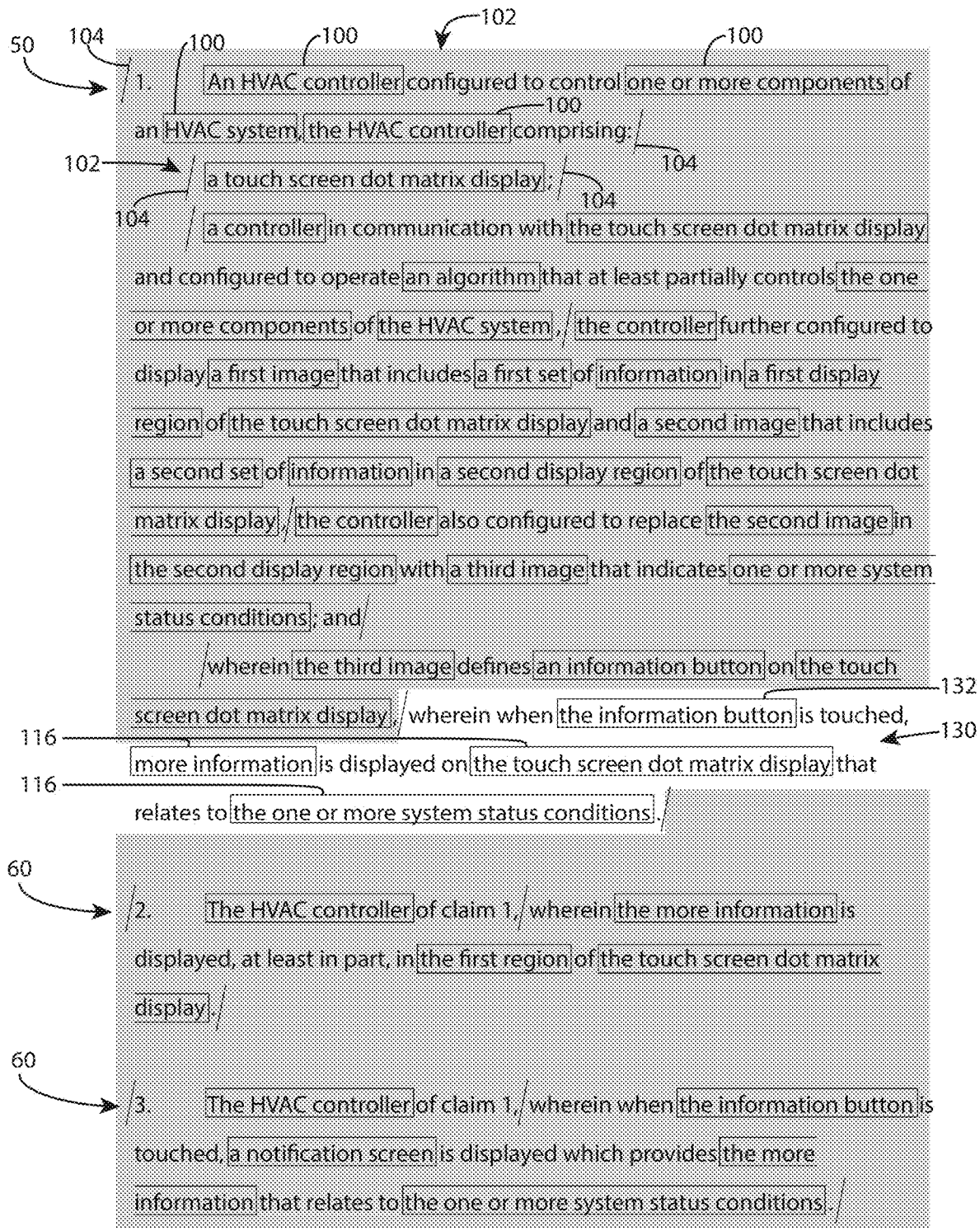

In another example, depicted in the illustrated embodiment of FIG. 10, the feature fragment 130 shown active without being greyed out includes a feature topic noun phrase 132 ("the third image") that corresponds to a predicate noun phrase 116 of a statement fragment 102 preceding the feature fragment 130. Likewise, the feature fragment 130 shown active in the illustrated embodiment of FIG. 11 includes a feature topic noun phrase 132 ("the information button") that corresponds to a predicate noun phrase 116 of a statement fragment 102 prior to the feature fragment 130.

The feature fragment 130 may be identified by presence of the feature topic noun phrase 132, or additional or alternative criteria such as the statement fragment 102 being positioned with a fragment boundary 104 that may not follow a newline or follows a newline but includes a token "wherein" or other identifying token.

The feature topic noun phrase 132 of the feature fragment 130 may not be the same as the base topic noun phrase 114 of the base fragment 120 preceding the feature fragment 130. For instance, the feature topic noun phrase 132 may correspond to any type of noun phrase 100, such as a predicate noun phrase 116, of a statement fragment 102 that precedes the feature fragment 130. In this way, a feature fragment 130 may be based on another feature fragment 130 and so on.

Figure 12:
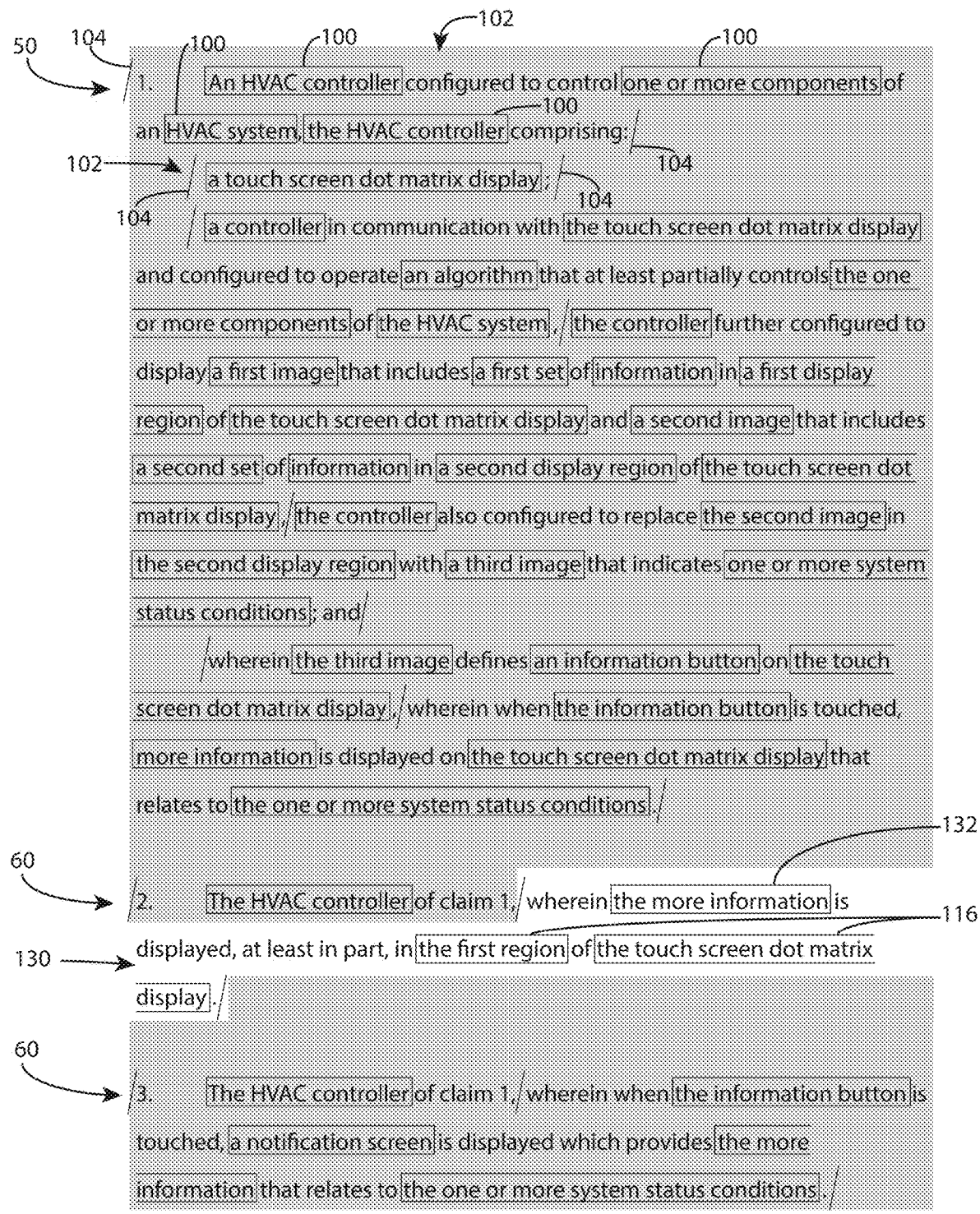
Figure 13:
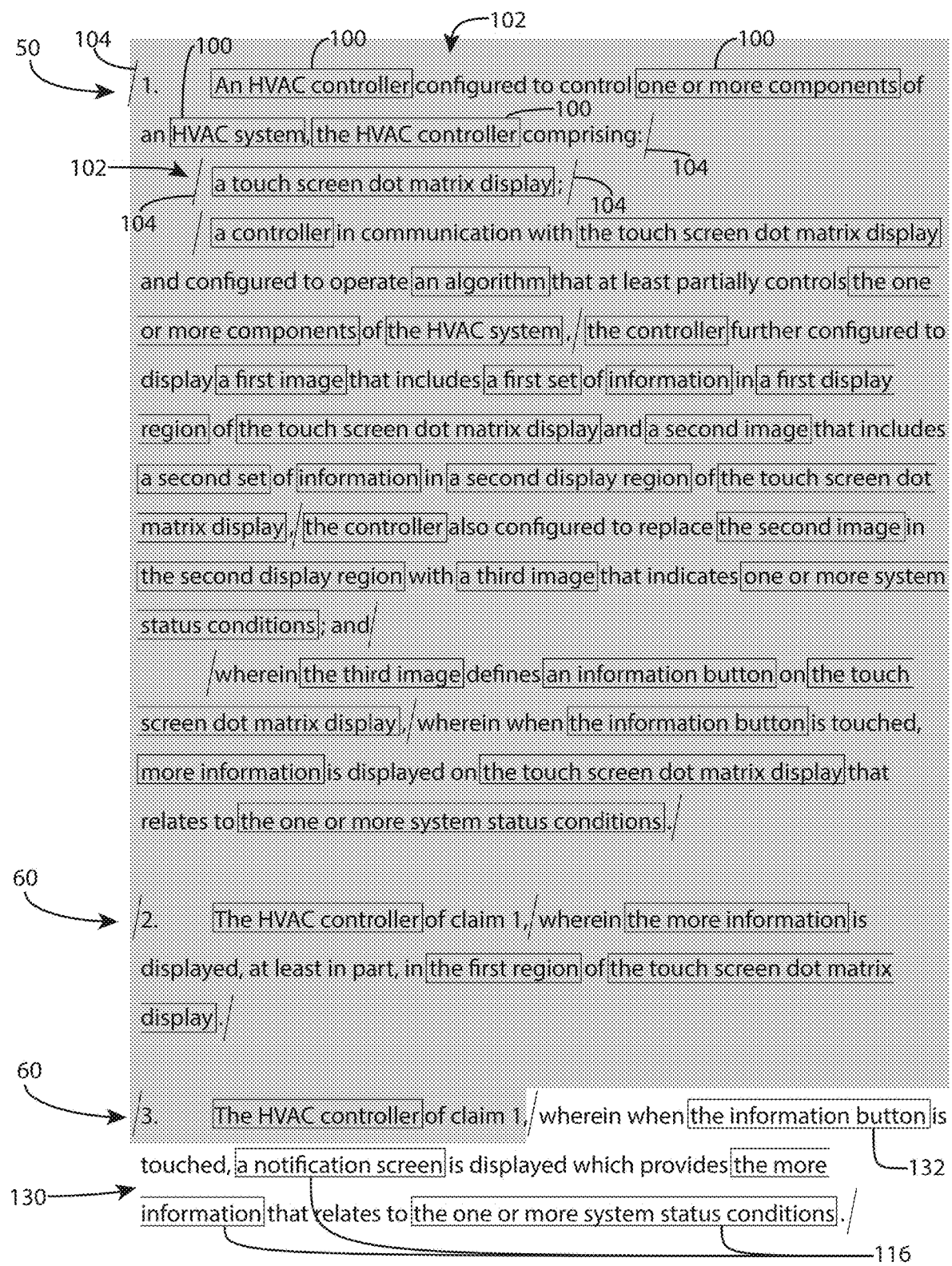

The illustrated embodiments of FIGS. 12 and 13 provide examples of feature fragments 130, shown active, in a child statement 60 and with a feature topic noun phrase 132 that expands on a noun phrase 100 recited in a statement fragment 102 that precedes the feature fragment 130. In both cases depicted in the illustrated embodiments, the statement fragment 102 that precedes the feature fragments 130 shown active are themselves feature fragments 130, reciting respectively "the more information" and "the information button" corresponding to the feature topic noun phrases 132.

III. Model Input and Model Output (Paragraph Generation)

Several methods of training a model and generating a plurality of tokens are depicted in the illustrated embodiments of FIGS. 14-18. The document compilation process according to one embodiment of the present disclosure may involve providing a statement fragment 102 as an input to a model type (e.g., Model Type M1) to generate one or more tokens as an output. The output may correspond to a paragraph of text incorporated into the document being generated. In this way, the model type may correspond to a paragraph type or fragment type.

Figure 14:
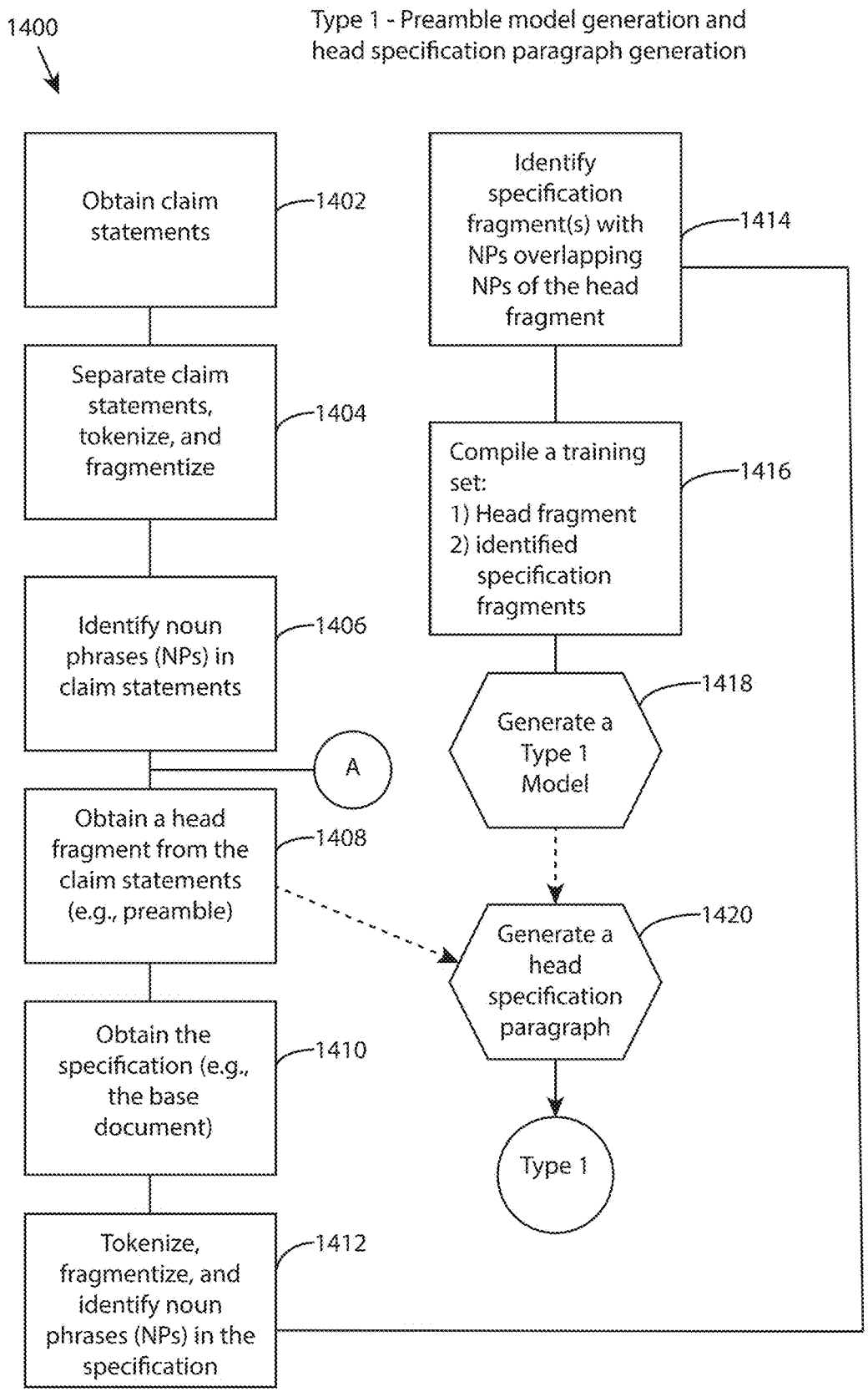
FIG. 14 shows a method of training a first type of model and generating a first type of paragraph according to one embodiment.

The illustrated embodiment of FIG. 14 depicts a method 1400 for training and generating output from a Model Type M1. As discussed above, the statement fragment 102 provided to the Model Type M1 according to one embodiment is the preamble fragment 110 to generate a paragraph of one or more tokens relating to the content of the preamble fragment 110.

The method 1400 may include obtaining one or more claim statements from a document, such as a reference from the reference database 240 or the seed document 212, with the claim statements including one or more head statements 50 and zero or more child statements 60. Step 1402. The claim statements may be separated into individual statements corresponding to either a head statement 50 or child statement 60. Each individual statement may be tokenized and parsed so that noun phrases 100 within the individual statement can be identified. Each individual statement may be fragmentized to yield one or more fragments according to criteria discussed herein, including fragmentized to yield the preamble fragment 110. Steps 1404, 1406.

Tokenization and parsing in accordance with one embodiment may involve identifying words of a statement or fragment as tokens, assigning a part of speech to each token (also described as parts of speech (POS) tagging), and identifying associations between tokens to identity phrase groups within the statement or fragment. For instance, the statement "the quick brown fox jumps over the lazy dog" may be tokenized and parsed as follows:

---

Tokenization: [the, quick, brown, fox, jumps, over, the, lazy, dog]

POS Tagging: [the/DT, quick/JJ, brown/JJ, dog/NN, jumps/VB, over/IN, the/DT, lazy/JJ, dog/NN]

Phrase Associations or Parsing Output:

(S (NP the/DT quick/JJ brown/JJ dog/NN)

jumps/VB

-continued

```
    over/IN
    (NP the/DT lazy/JJ dog/NN)
)
```

The parts of speech symbols identified in the example above include DT, IN, JJ, NN, and VB and correspond respectively to a singular determiner, a preposition, an adjective, a singular noun, and a verb in base form. These symbols correspond to a subset of the part-of-speech tags used in the Brown Corpus or (Brown University Standard Corpus of Present-Day American English), which is incorporated herein by reference in its entirety. It should be understood that there may be many additional types of parts of speech utilized in tagging the tokens, and that the present disclosure is not limited to the POS tags identified in the example above. Further, it should be understood that an alternative tagging scheme other than the one utilized in the Brown Corpus may be utilized for POS tagging.

In the example above, the statement is parsed into groups of tokens (based at least in part on the POS tagging of the tokens) identified by the symbol NP corresponding to a noun phrase group. Additional or alternative groupings may be identified, including verb phrases and prepositional phrases. This type of classification of groups of adjacent tokens may be identified as chunking (e.g., noun phrase chunks). However, the present disclosure is not so limited—dependency parsing may also be utilized so that associations between non-adjacent tokens may be identified, such as the direct object and the noun object relative to a verb or prepositional object.

The POS tagging and parsing of tokens in a statement may be achieved in a variety of ways, depending on the application. One example tagger and parser is the SyntaxNet parser available from Google®, named colloquially as Parsey McParseface.

In the illustrated embodiment, the head statement 50 may be POS tagged, parsed, and fragmentized according the criteria set forth herein to yield a preamble fragment 110 that is POS tagged and parsed. Step 1408. For instance, tokens (POS tagged and parsed) leading up to the token "comprising" may be identified as part of the preamble fragment 110.

At this stage, the method 1400 may bifurcate between training the Model Type M1 or providing the preamble fragment 110 as an input to the Model Type M1 (already trained) to generate one or more tokens corresponding to a head paragraph to be included in the document compilation. The phantom lines to Step 1420 illustrate this possibility between training the Model Type M1 and use of an already trained version of the Model Type M1, which may be obtained from model storage 250.

For purposes of disclosure, the method 1400 will now be described in connection with training the Model Type M1—but it should be understood that, after the preamble fragment 110 has been obtained, the method 1400 may proceed to use of an already trained version of the Model Type M1 at Step 1420. In training the Model Type M1, a target output may be obtained for comparison against the preamble fragment 110. The target output may be based on text (e.g., specification text) associated with the head statement 50 in a reference document obtained from the reference database 240. This text may be tokenized, POS tagged, and parsed (e.g., parsed into noun phrases 100), and fragmentized in a manner similar to the head statement 50 described with respect to Steps 1402, 1404 and 1406. Fragmentation, such as breaking the text into multiple statements, may be conducted prior to, after, or as an intermediate step to tokenizing, POS tagging, and parsing, and may include defining groups of statements or sentences associated with each paragraph of the specification text. Step 1412.

The method 1400 according to the illustrated embodiment may identify portions of the text associated with the head statement 50, depicted in the illustrated embodiment as specification text. Step 1414. The portions of text may be identified based on a variety of criteria, as described herein, including portions of text that include noun phrases 100 that are similar to or the same as noun phrases 100 in the preamble fragment 110. In one embodiment, it is not necessary for the identified text of the specification to include all of the noun phrases 100 of the preamble fragment 110. Rather, use of noun phrases 100 that are similar is an indication of similarity between the preamble fragment 110 and the identified text. In one embodiment, the criteria for the portion of specification text may include having no noun phrases 100 present in other fragments of the head statement 50 and any child statement 60 related to the preamble fragment 110.

Additionally or alternatively, a portion of the specification text may be identified by a similarity metric that is based on comparing distinct aspects of the specification text and claim statements. For instance, if the terms "widget" and "bar" are somewhat infrequent in the specification text and claim statements but the preamble fragment 110 and a portion of the specification text both utilize these terms, that portion of specification text may be identified for use as a target output of the Model Type M1.

It is noted that the identified portion of the specification may include more than one statement or sentence, preferably but not limited to a paragraph of text bounded by newlines in the specification text.

The preamble fragment 110 may be associated with the identified portion of specification text as an input/output pair. This process may be conducted numerous times, including associating a preamble fragment 110 with a portion of specification text from the same document from which the preamble fragment 110 is extracted. This way, a large set of input/output pairs may be collected and used for training the Model Type M1 to yield an output based on an input corresponding to a preamble fragment 110. Steps 1416 and 1418. The trained model may be stored in memory 224 or model storage 250 for use at a later stage.

With a trained version of the Model Type M1 stored in memory 224 or model storage 250, the method 1400 may sidestep the training process, including steps 1410, 1412, 1414, 1416 and 1418, and proceed to generate output based on a preamble fragment 110. Step 1420. In this case, the preamble fragment 110 may be obtained from a seed document 212, and provided to the Model Type M1 in order to generate a paragraph of text or one or more tokens.

Figure 15:
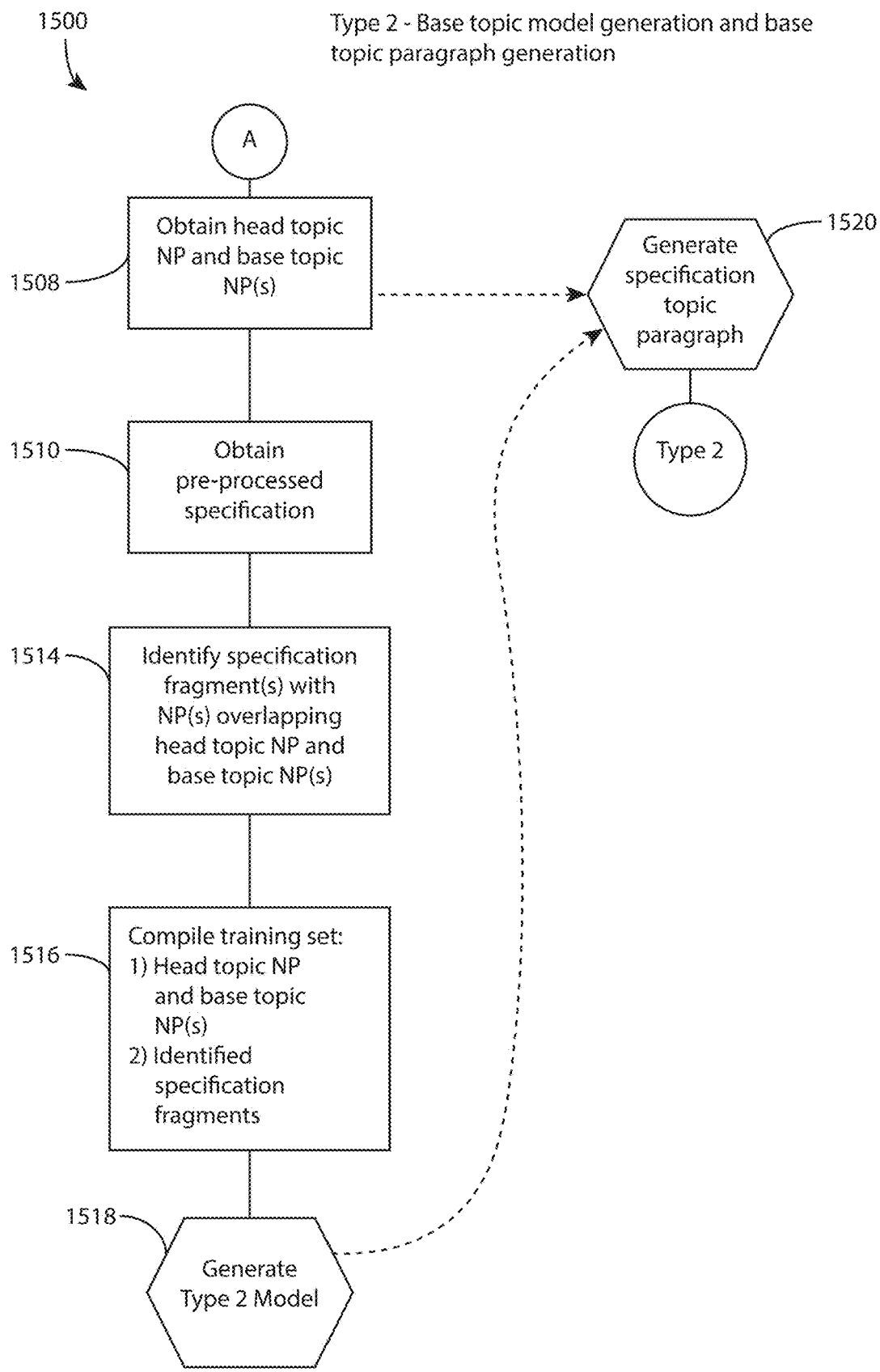
FIG. 15 shows a method of training a second type of model and generating a second type of paragraph according to one embodiment.

In the illustrated embodiment of FIG. 15, a method 1500 is provided for training and generating output from a Model Type M2. As discussed above, the statement fragment 102 provided to the Model Type M2 according to one embodiment is an aggregate fragment to generate a paragraph of one or more tokens, Paragraph Type P2, relating to the content of the base components of the head statement 50, and optionally any base components of any child statements 60 dependent on the head statement 50 according to the tree structure outlined herein. The base components, identified as a base topic noun phrase 114 from one or more base fragments 120, may relate to the basic structure of the content to which the claim statements are directed. The aggregate fragment may be defined according to these base components or base topic noun phrases 114, and used as a basis for training the Model Type M2 to generate one or more tokens as an output that may relate to the relationship of the base components.

The method 1500 may include obtaining one or more claim statements, including one or more head statements 50 and zero or more child statements 60, and separating, tokenizing, and fragmentizing the one or more claim statements, similar to steps 1402 and 1404 described herein with respect to the method 1400. The method 1500 may also involve POS tagging and parsing the one or more claim statements to identify noun phrases 100 therein, similar to step 1406 of the method 1400.

The method 1500 according to the illustrated embodiment may generate an aggregate fragment based on one or more base topic noun phrases 114 identified in one or more respective base fragments 120 of the one or more claim statements. Step 1508. Similar to the method 1400, the method 1500 may branch at this stage between 1) training the Model Type M2 to take as an input the aggregate fragment and to output a Paragraph Type P2, including a plurality of tokens pertaining to the content of the aggregate fragment, or 2) applying the aggregate fragment as the input to generate the output. This optional branch is shown in phantom lines in FIG. 15.

For purposes of disclosure, the method 1500 is described next in connection with training the Model Type M2, but it should be understood that, as discussed herein, the process may proceed to generating a Paragraph Type P2 from the aggregate fragment. Step 1520.

In the illustrated embodiment, based on the aggregate fragment and its base topic noun phrases 114, a portion of the specification text may be identified that is similar to the content of the aggregate fragment. Steps 1510, 1514. For instance, the identified portion may correspond to a paragraph of the specification text that recites noun phrases 100 that are the same or substantially similar to the base topic noun phrases 114 of the aggregate fragment. There are a variety of additional or alternative criteria described herein that may be utilized in identifying a portion of the specification text that is similar to the aggregate fragment, including a similarity metric that includes identifying a paragraph of the specification text that is more similar to the statement fragment 102 (e.g., aggregate fragment) than any other paragraphs of the specification text.

The specification text may be tokenized, POS tagged, parsed, and fragmentized in a manner similar to the process outlined with respect to Steps 1410 and 1412 described in connection with the illustrated embodiment of FIG. 14. This analysis of the specification text may facilitate identifying a portion of the specification text that is similar to the aggregate fragment, and to compile a training input/output pair corresponding to the aggregate fragment and the identified portion of specification text. Similar to the method 1400, multiple input/output pairs, thousands or hundreds of thousands or greater, may be generated for training based on references obtained from the reference database 240. Step 1416. The Model Type M2 may be trained, as described herein, based on the input/output training pairs, and stored in memory 224 or model storage 250 for use at a later stage to generate a Paragraph Type P2 based on an aggregate fragment provided as an input. Steps 1518, 1520.

Figure 16:
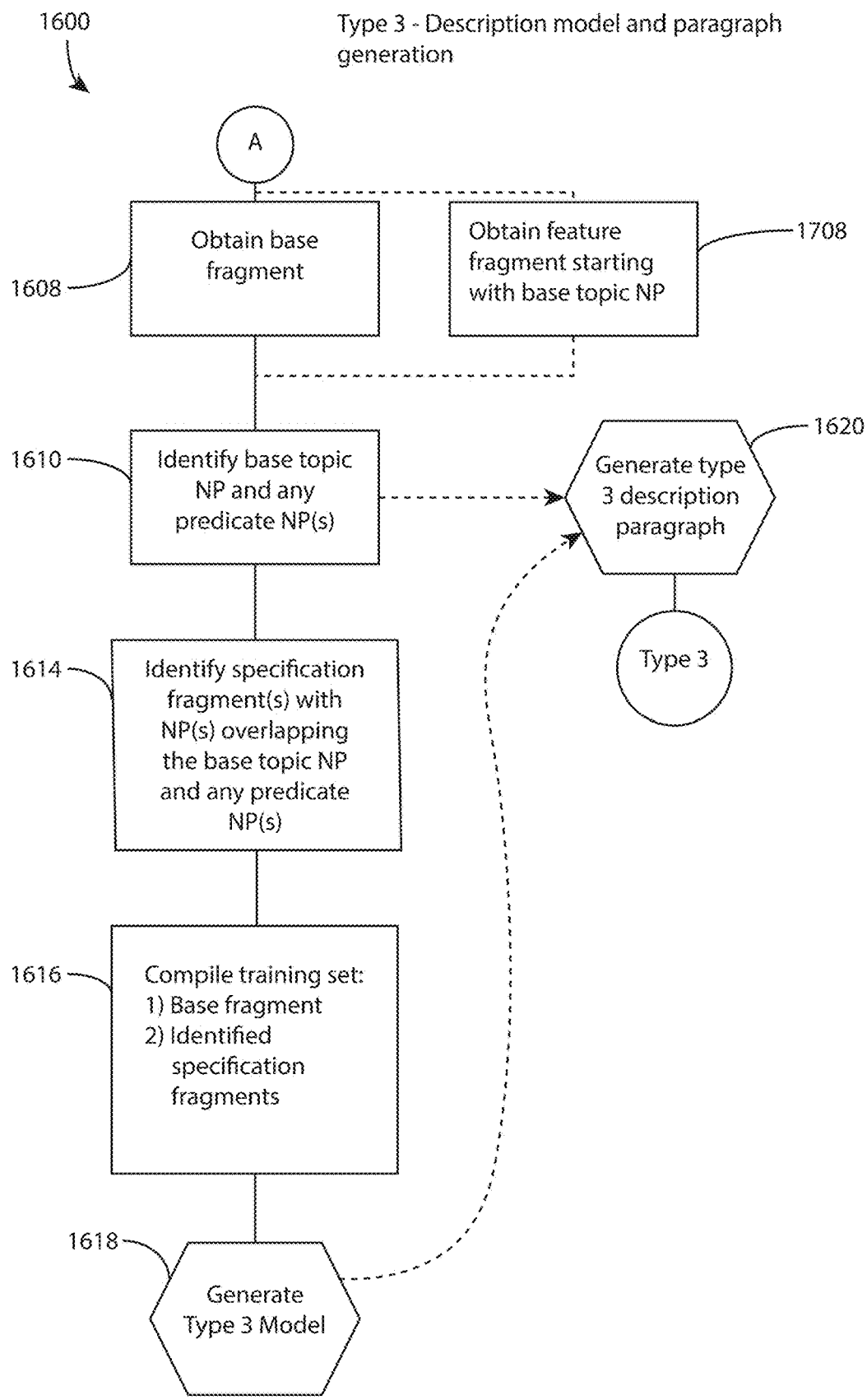
FIG. 16 shows a method of training a third type of model and generating a third type of paragraph according to one embodiment.
Figure 17:
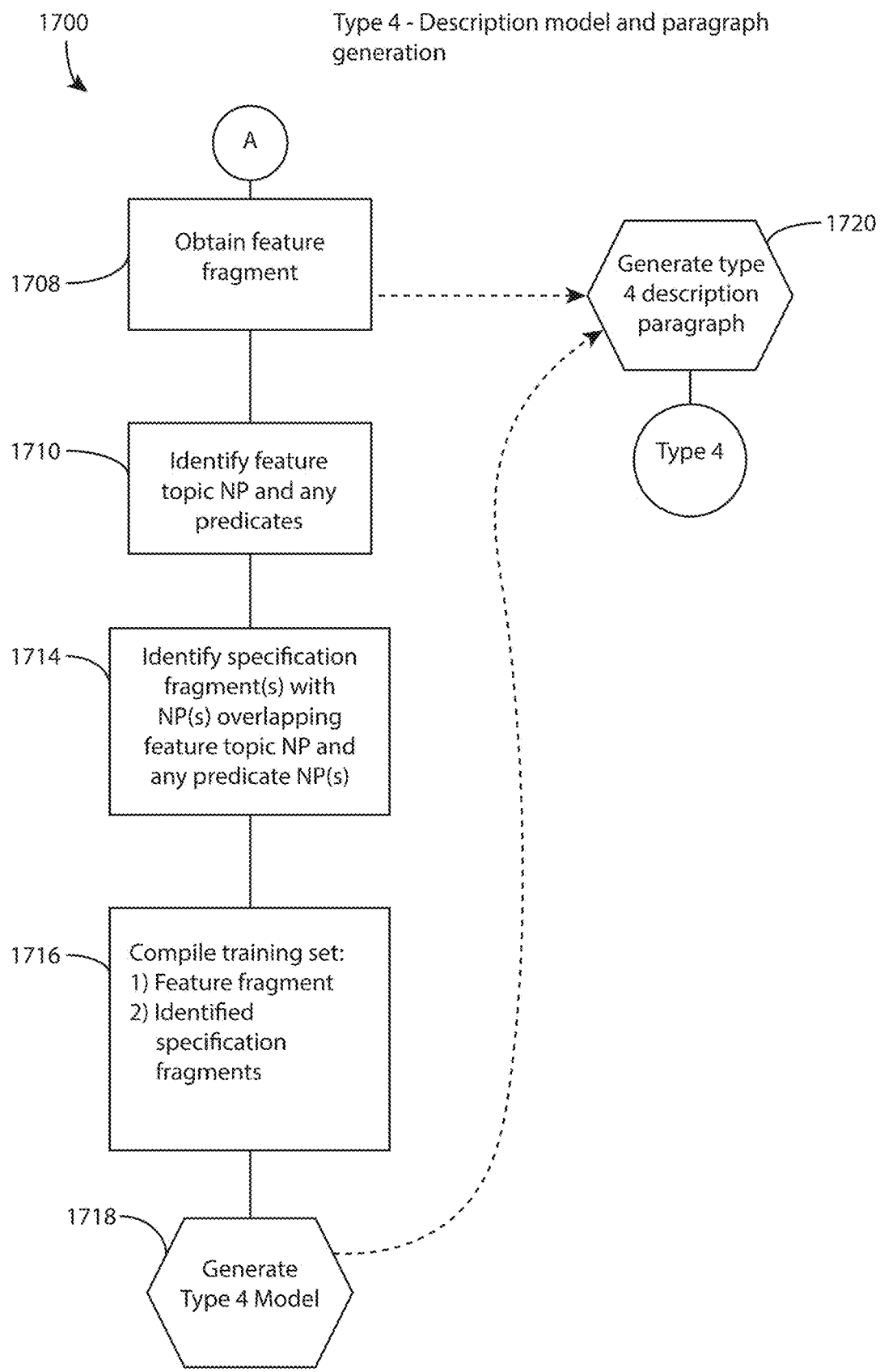
FIG. 17 shows a method of training a fourth type of model and generating a fourth type of paragraph according to one embodiment.

Turning to the illustrated embodiments of FIGS. 16 and 17, methods 1600 and 1700 are shown for training and generating output from a Model Type M3 or a Model Type M4 to respectively generate a Paragraph Type P3 or Paragraph Type P4 based on a base fragment 120 or a feature fragment 130. The methods are similar in many respects to the methods 1400 and 1500 with several exceptions. For instance, the methods 1600 and 1700 may include obtaining one or more claim statements, including one or more head statements 50 and zero or more child statements 60, and separating, tokenizing, and fragmentizing the one or more claim statements, similar to steps 1402 and 1404 described herein with respect to the method 1400. The methods 1600 and 1700 may also involve POS tagging and parsing the one or more claim statements to identify noun phrases 100 therein, similar to step 1406 of the method 1400.

The methods 1600 and 1700 according to the illustrated embodiment may obtain a base fragment 120 or a feature fragment 130 from the one or more claim statements, and identify a portion of specification text (e.g., a paragraph) that is similar to the base fragment 120 or the feature fragment 130. Steps 1610, 1614, 1710, 1714. Similarity may be based on criteria described herein, including, for example, recitation of the same or substantially similar noun phrases 100, such as a recitation of the base topic noun phrase 114 or the feature topic noun phrase 132 and any predicate noun phrases 116. The specification text may be processed in a manner similar to that described herein in connection with the illustrated embodiments of FIGS. 14 and 15 to facilitate identifying the portion of the specification text that is similar to the base fragment 120 or the feature fragment 130.

In the method 1600, the base fragment 120 may be associated with a similar portion of specification text, such as a paragraph of the specification text, to form an input/output pair for training the Model Type M3. Step 1616. This process may be conducted for many base fragments 120 from many references to obtain numerous input/output pairs for training. Likewise, the method 1700 may including forming input/output pairs for training the Model Type M4 based on the feature fragment 130 and a similar portion of the specification text. Step 1716. With the input/output training pairs, preferably much greater than a thousand of them, the system according to one embodiment may train the respective Model Type M3 or Model Type M4, and save the trained model in memory 224 or model storage 250. Steps 1618, 1718. The trained models may be provided to generate, respectively, a Paragraph Type P3 or Paragraph Type P4 based on an input corresponding to the base fragment 120 or the feature fragment 130. Steps 1620, 1720.

Figure 18:
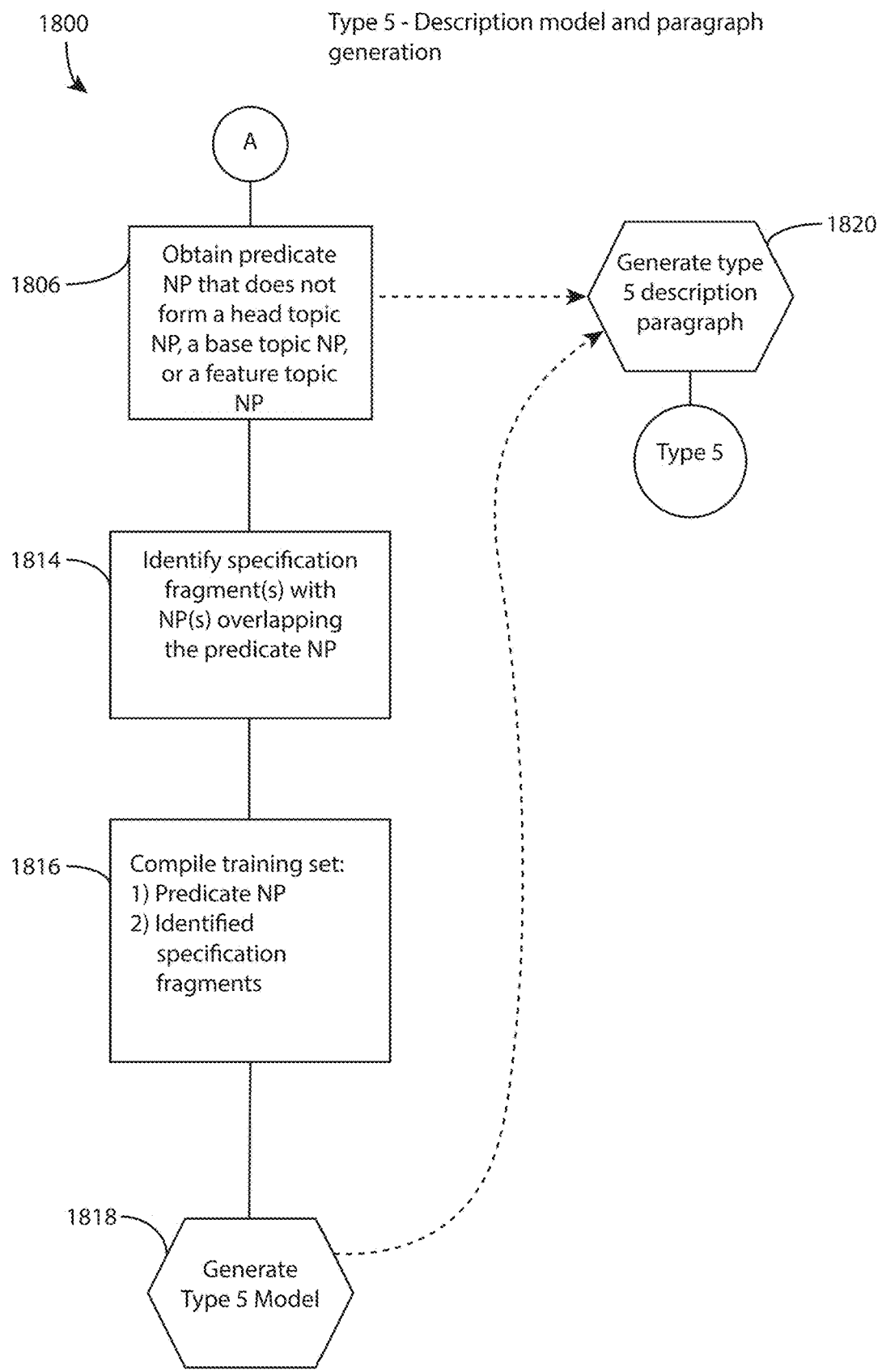
FIG. 18 shows a method of training a fifth type of model and generating a fifth type of paragraph according to one embodiment.

The illustrated embodiment of FIG. 18 depicts yet another method 1800 for training and generating output from a Model Type M5 that corresponds to content related to a noun phrase 100, such as a predicate noun phrase 116, that is also not identified in the claim statements as a head topic noun phrase 112, a base topic noun phrase 114, or a feature topic noun phrase 132. As an example, the noun phrase "algorithm" in the illustrated embodiment of FIG. 3 satisfies this criteria and may be provided to the Model Type M5 as an input. Step 1806. A noun phrase 100 that satisfies this criteria may be used as a basis for identifying a portion of the specification text so that the Model Type M5 may be trained to generate a plurality of tokens that relate to the noun phrase 100. Step 1814. The criteria for identifying the portion of specification text may be similar to the techniques described herein with respect to the illustrated embodiments of FIGS. 14-17, such as presence of the noun phrase 100 but no other noun phrases 100 of the head statement 50 or any of its child statements 60.

With numerous training pairs corresponding to the noun phrase 100 identified for the Model Type M5 as an input and a similar portion of specification text as an output, the Model Type M5 may be trained as discussed herein. Steps 1816, 1818. The Model Type M5 may be stored in memory 224 or model storage 250 for use with respect to a noun phrase 100 that is potentially previously unseen in order to generate a plurality of tokens related to the noun phrase 100. Step 1820.

IV. Model Generation and Training

Figure 19:
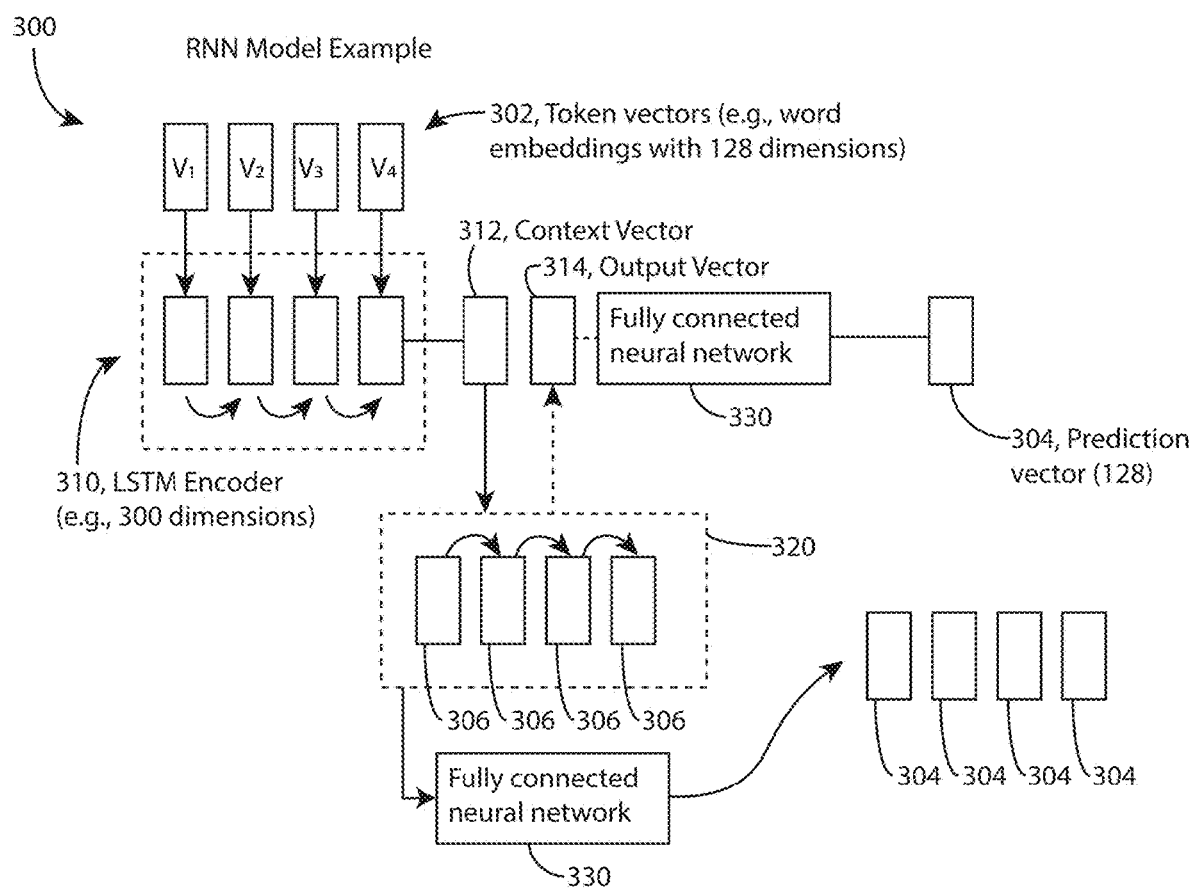
FIG. 19 depicts a representative view of a model according to one embodiment.

An example model is shown according to one embodiment of the present disclosure in FIG. 19, and generally designated 300. The example model is depicted as a sequence-to-sequence type of model 300 utilizing one or more layers of a recurrent neural network (RNN), such as a long short-term memory (LSTM) network. It should be understood the present disclosure is not limited to use of RNN layers or LSTM layers, and that any type of model 300 and any number of layers may be utilized.

The model 300 may take as an input a plurality of tokens that are vectorized based on the vector database 230. This way, the input to the model 300 may be a sequence of vectors 302 labeled V1, V2, V3 and V4, each of the vectors 302 having a dimension X (e.g., 128). The first layer of the model 300 is an LSTM encoder 310 which may encode the input sequence V1, V2, V3, V4 in a forward review manner, optionally backward review, to generate a context vector 312 provided to the LSTM decoder 320. Each step of the LSTM encoder 310 may be identified as a state having a dimensionality Y (possibly the same or different from the vector 302 dimensionality) that is fed as an input to the next block of the LSTM encoder 310. Each block of the LSTM encoder 310 may include many weights corresponding to the dimensionality of the LSTM encoder 310 that may be trained as discussed herein.

The LSTM decoder 320 may accept the context vector 312 output from the LSTM encoder 310, and generate an output 306 that may be provided to a neural network 330 or layer that translates the output 306 from the LSTM decoder 320 to the vector space utilized by the vector database 230. The output 306 of the first state or block of the LSTM decoder 320 may be provided to the next state or block. Optionally, each of the outputs 306 from the LSTM decoder 320 may be provided to the neural network 330, to yield a sequence of prediction vectors 304 representative of a likely token.

In the illustrated embodiment, the output 306 from each state or block may be provided to the next block or state. Put differently, the output 306 from each block in the LSTM decoder 320 may be provided to the next block in the sequence to generate a sequent token vector (or a vector fed to the neural network 330 to yield a token vector). Although the output 306 of each block in the LSTM decoder 320 is shown being provided to the next block in the sequence, the output of the neural network 330 in vector space X may be provided as an input to the next block in the sequence. The sequence generated from the LSTM decoder 320 may be variable in length, terminating on output of one or more end of line tokens. It should be noted that the end of line token may be provided at the end of each training output so that the model 300 is trained to generate the end of line token when the output sequence is considered complete.

In an alternative embodiment, the context vector 312 provided by the LSTM encoder 310 may be provided to the LSTM decoder 320, which may generate a vector output 314 that is provided to the neural network 330. This alternative is depicted with phantom lines in FIG. 19. The neural network 330 may translate this vector output 314 to vector space or a word embedding corresponding to a token or word. The output from the neural network 330 or the word embedding may be appended to the input sequence V1, V2, V3, V4. This modified input sequence may be provided to the LSTM encoder 310 and LSTM decoder 320 to generate the next word embedding in the output sequence. The input sequence may be a sliding window of the last Z number of vectors, such as the last 25 vectors (zero padded if less than 25 vectors exist) corresponding to the word embeddings of the input sequence appended with vectors generated through the LSTM encoder 310, LSTM decoder 320, and neural network 330. Although the model is described in connection with an LSTM encoder 310 and LSTM decoder 320, any type of encoder or decoder, or both, may be utilized. Further, the neural network 330 is optional. Additionally, or alternatively, no decoder and no neural network may be utilized so that the context vector from the encoder may be directly mapped to vector space of the vector database 230.

Figure 20:
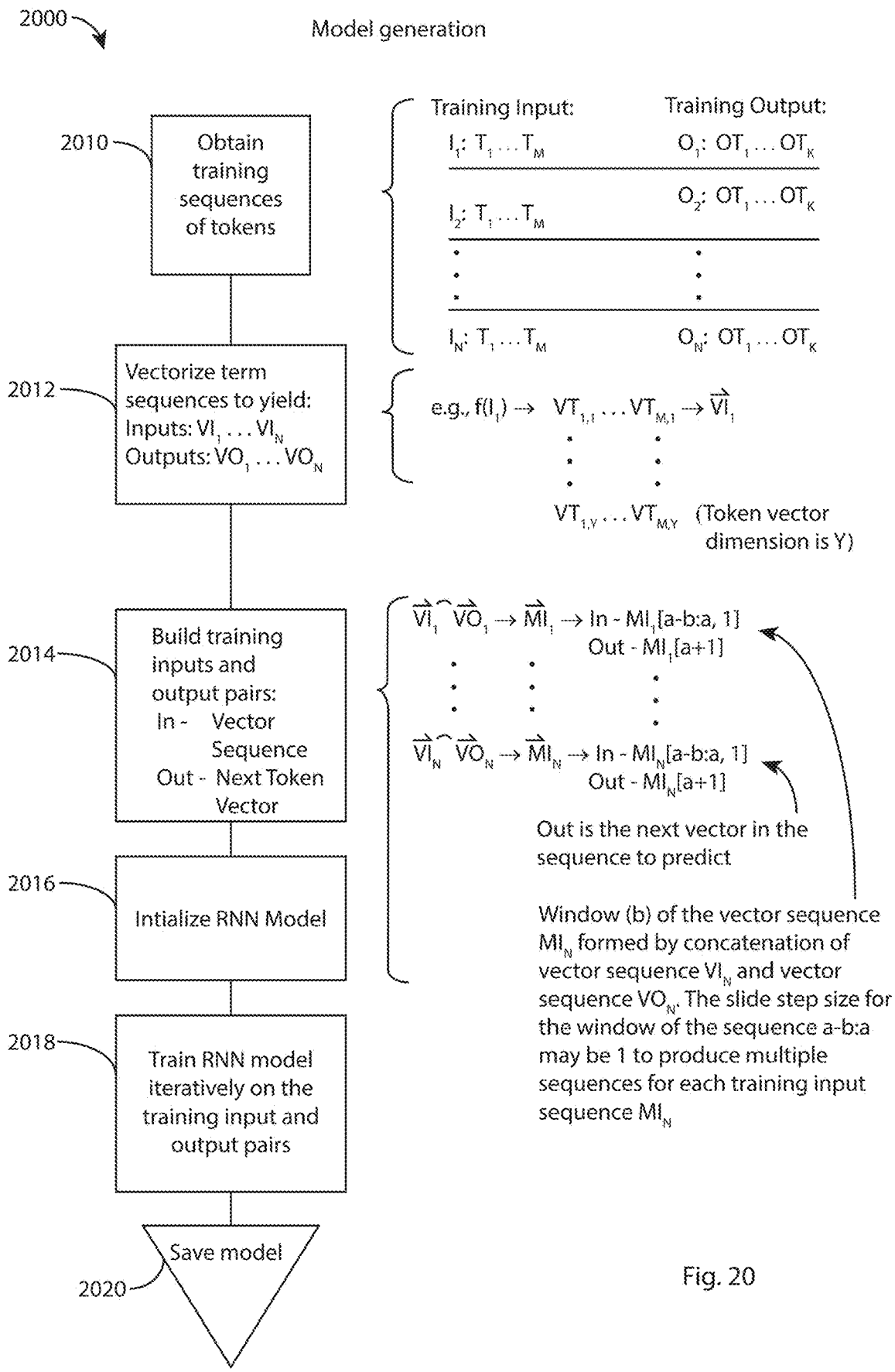
FIG. 20 shows a method of training the model of FIG. 19.

In FIG. 20, a method of training the model 300 in accordance with one embodiment is shown and designated 2000. The method 2000 may include obtaining a plurality of training pairs of input sequences and outputs sequences, with the input sequence being tokens (T1 . . . Tm) and the target output sequence being tokens (OT1 . . . OTk). Step 2010. The length of the input sequence may differ from the length of the output sequence, and the output sequence and/or input sequence may vary from training pair to training pair. The number of training pairs may be several thousand or more, and possibly several hundreds of thousands. Indeed, with the number of references available from the USPTO database being in the millions, it is possible to generate several million or more training pairs.

Each sequence of tokens may be vectorized into vector space based on the vector database 230. Step 2012. In the illustrated embodiment, each token is vectored to a dimension Y so that T1→VT_1, 1 . . . Y. The input sequence of tokens I1 after being vectored is identified as VI1, and the output sequence of tokens O1 after being vectored is identified as VO1.

In the illustrated embodiment, the method 2000 includes training a model to generate a single output that is appended to an input sequence for generating the next output. This may be described as a sliding window as discussed in connection with the illustrated embodiment of FIG. 19. To yield a training set for such a configuration, the vector input sequence VI and vector output sequence VO are concatenated to form sequence MI. A sliding window of size b (e.g., 25) is applied across the sequence MI for each position a (e.g., the step size may be 1) with the input sequence corresponding to the subset MI[a−b . . . a] of the sequence MI[1 . . . m+k] where 1<a<m+k. The subset may be zero padded in cases where a<b or b>m+k. The output associated with each sequence subset of MI may be MI[a+1] or the next token vector in the sequence. Step 2014.

The model may be initialized with weights for each node of the model, such as each node of the LSTM encoder 310, the LSTM decoder 320, and the neural network 330. Step 2016. The input sequences may be provided to the model to generate an output, and based on the error between the output and the target output, the weights may be adjusted. Step 2018. In one embodiment, input sequences may be provided to the model several or more times (epochs) such that the weights are adjusted a number of times to reduce the error between the model output and the target output. This way, the model can be adjusted to more closely approximate the correct output or target output for a given input sequence. In one embodiment, gradient descent may be utilized to reduce the error by changing each weight in proportion to the derivative of the error with respect to the weight being changed.

After the model has been trained such that an acceptable degree of error has been achieved, the model may be stored in memory 224 or model storage 250. Step 2020.

V. Document Compilation—Paragraph Types P1, P2, P3, P4 and P5

The document generator 210 in accordance with one embodiment may generate a document based on a seed document 212 and output from one or more models obtained from the model storage 250. In the illustrated embodiment of FIGS. 2 and 21, the one or more models include the five types of models described herein and associated with various aspects of a seed document 212, which is similar in some respects to the reference documents obtained from the reference database 240 queried for training the one or more models. For instance, the seed document 212 may include a plurality of statements or claim text arranged in a tree structure, including one or more head statements 50 and one or more child statements 60. However, the seed document 212 provided to the document generator 210 may not include specification text or a substantial amount of specification text in contrast to the reference documents obtained from the reference database 240. The document generator 210 in the illustrated embodiment is configured to generate specification text based on the plurality of statements or claim text. The document generator 210 may be configured for other type of documents, including a software requirements document based on a hierarchical list of software requirements.

As described herein, there are five types of inputs provided respectively to the five types of models. It should be understood that the five types of inputs are provided as example ways in which aspects of the one or more head statements 50 and one or more child statements 60 may be categorized into fragments or groups of tokens according to one or more criteria. The same or similar criteria may be used in generating one or more fragments from the references of the reference database 240 to train a respective model type. There may be more or fewer models utilized to compile a document, and one or more models configured differently.

The preamble fragment 110 of the references from the reference database 240 may be extracted from a head statement 50 and utilized as a basis for training the Model Type M1 to generate the Paragraph Type P1 as an output. The preamble fragment 110 may be identified from the seed document 212 and input to the Model Type M1 to generate a plurality of tokens as output in a similar manner. This output or Paragraph Type P1 may be compiled with output from one or more additional model types to generate a document.

Figure 2:
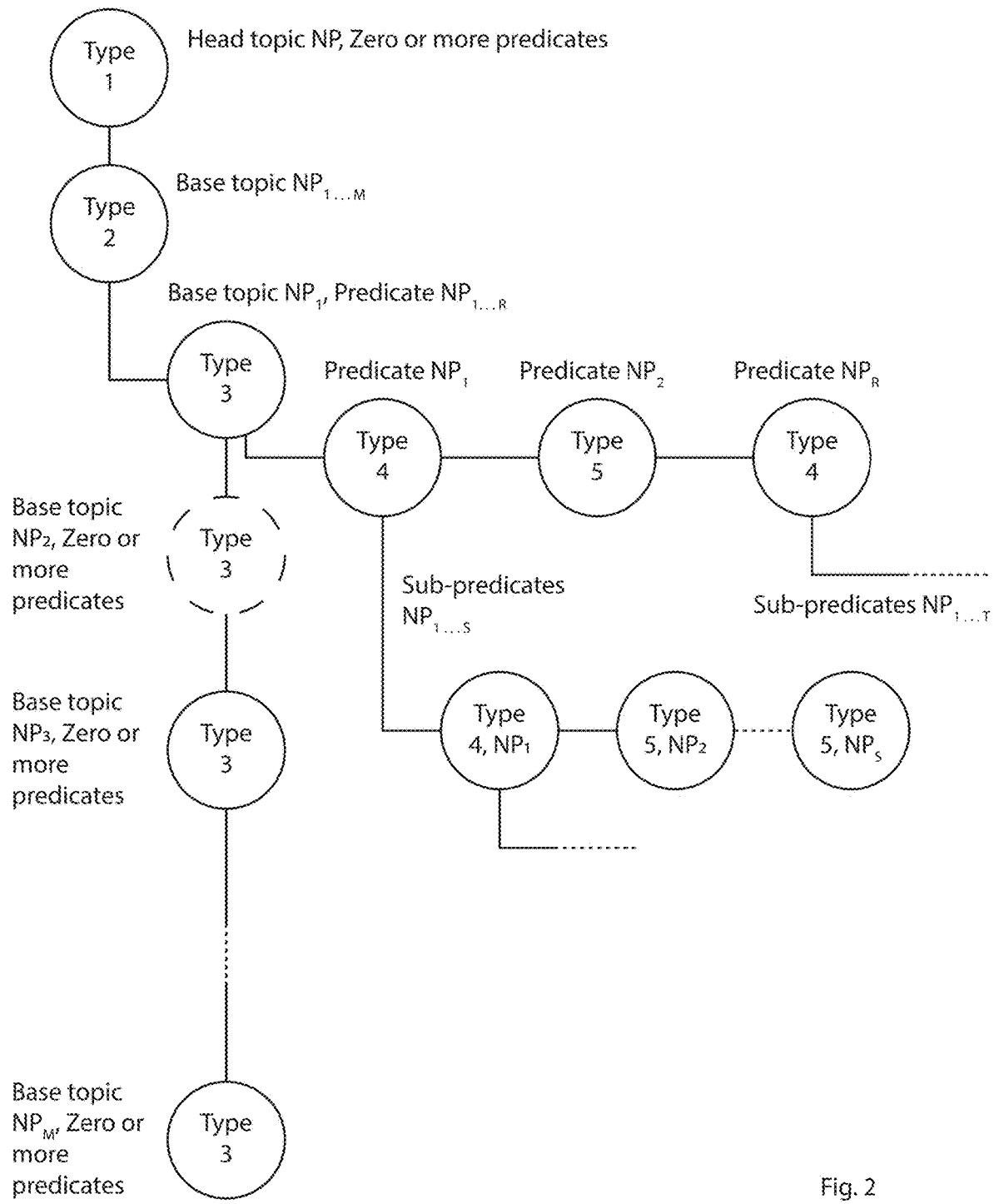
FIG. 2 shows a document compilation structure of a document according to one embodiment.

According to one embodiment, depicted in the illustrated embodiment of FIG. 2, the document generator 210 may utilize 5 types of models to compile a document based on a plurality of statements that define a tree structure of one or more head statements 50 and one or more child statements 60. For purposes of disclosure, the model types are associated with paragraph types that are labeled Paragraph Type P1, Paragraph Type P2, Paragraph Type P3, Paragraph Type P4, and Paragraph Type P5 in the illustrated embodiment. Each of the paragraph types may be associated with a type of fragment extracted from the seed document 212 or the plurality of statements according to one or more criteria, as discussed herein.

In the illustrated embodiment of FIG. 2, the model types are associated with statement fragments 102 to output a paragraph type according to the following:

Model Type M1: input—the preamble fragment 110, output—Paragraph Type P1;
Model Type M2: input—the aggregate fragment, output—Paragraph Type P2;
Model Type M3: input—the base fragment 120, output—Paragraph Type P3;
Model Type M4: input—the feature fragment 130, output—Paragraph Type P4; and
Model Type M5: input—a noun phrase 100, output—Paragraph Type P5.

The statement fragments 102 may be selectively input to one or more models to generate a paragraph output tree structure, such as the one outlined in the illustrated embodiment, that define organization of the output from the one or more models. It should be understood that that output of the one or more models may be organized differently or according to a different paragraph organization or arrangement.

The preamble fragment 110 may be associated with a topic set of tokens defined as the Paragraph Type P1 and generated from the Model Type M1. This set of tokens may form a paragraph of the document to be generated that provides an overview or context for the paragraphs to follow that are based on statement fragments 102 of the head statement 50 or child statement 60 that provides the preamble fragment 110.

The aggregate fragment discussed herein may be formed of one or more noun phrases 100 of a plurality of statement fragments 102, such as the base topic noun phrases 114 of a plurality of base fragments 120. This way, the aggregate fragment may correspond to basic topics or elements of the head statement 50, or head statement 50 and one or more child statements 60. Providing this aggregate fragment as an input to a Model Type M2 may enable generation of a plurality of tokens defined as the Paragraph Type P2 and relating to the plurality of noun phrases 100 provided in the aggregate fragment, and which may be expanded upon through generation of further tokens (e.g., Model Types M3, M4, M5) based on the statement fragments 102 from which the noun phrases 100 have been extracted for inclusion in the aggregate fragment.

The tokens output from the Model Type M2 and based on input of the aggregate fragment may be appended as another paragraph to the Paragraph Type P1 generated from the Model Type M1.

The base fragment 120 extracted from the head statement 50 or child statement 60 may form the basis for providing input to a Model Type M3 trained to generate a plurality of tokens that expand on the concepts outlined in the base fragment 120, including, for example, the base topic noun phrase 114 and zero or more predicate noun phrases 116 that follow the base topic noun phrase 114. Other aspects or other tokens, such as verb phrases or linking verbs, of the base fragment 120 may be utilized by the Model Type M3 to generate the plurality of tokens defined as the Paragraph Type P3. The output from the Model Type M3 may be appended as another paragraph to the document being compiled, including the paragraphs from the Model Type M1 and Model Type M2.

At this stage, as depicted in the illustrated embodiment of FIG. 2, the process of generating additional paragraphs for compiling the document to be generated may be iterative based on whether the base fragment 120 includes one or more predicate noun phrases 116, and whether each predicate noun phrase 116 is further identified as a feature topic noun phrase 132 in a feature fragment 130. For instance, as depicted in the illustrated embodiment, a base fragment 120 that is the first among several base fragments 120 is associated with the base topic noun phrase 114 designated base topic NP1 and includes multiple predicate noun phrases 116 designated predicate topics NP1 . . . M.

The first predicate topic NP1 is identified as a feature topic noun phrase 132 in a feature fragment 130, and provided as an input to the Model Type M4 to generate a plurality of tokens to form the Paragraph Type P4 with text relevant to the predicate topic NP1 and its relation to other noun phrases 100 in the feature fragment 130. This process may be iterated for each predicate noun phrase 116 (NP1 . . . NPM) that forms a feature topic noun phrase 132 of a feature fragment 130. For each predicate noun phrase 116 that does not correspond to a feature topic noun phrase 132, the predicate noun phrase 116 may be provided as an input for the Model Type M5 to generate a Paragraph Type P5 with tokens relevant to the predicate noun phrase 116.

The same process as outlined for the first predicate topic NP1 of the base fragment 120 may be conducted for each of the following predicate topics NP2 . . . M. For each iteration, a paragraph of text may be generated from a type of model, and appended to paragraphs previously generated. The document may be compiled piece by piece in this way from paragraphs output from one of the models and based on statement fragments 102 of various classifications.

In some cases, a base fragment 120 may include a base topic noun phrase 114 with no other predicate noun phrases 116. In this case, the base fragment 120 may be provided as an input to the Model Type M3 or a Model Type M5 to generate a plurality of tokens describing aspects included in the base fragment 120, including the base topic noun phrase 114. The iterative process identified above for one or more predicate noun phrases 116 may not be necessary for the base fragment 120 in this case because there are no predicate noun phrases 116. This type of base fragment 120 is shown in FIG. 2 in phantom lines with no predicate topics.

There also are instances in which there is no corresponding feature fragment 130 for a predicate noun phrase 116 of a statement fragment 102. As discussed above, this predicate noun phrase 116 may be provided as an input to the Model Type M5 to generate a Paragraph Type P5. Optionally, the predicate noun phrase 116 may be provided by itself to the Model Type M3 or Model Type M4 to generate a plurality of tokens relating to the predicate noun phrase 116. These tokens may form a paragraph of text included in the document being compiled.

In the illustrated embodiment, each of the base fragments 120 and feature fragments 130 may be iterated through, and outputs relating to each fragment are organized as paragraphs appended to each other for each iteration. It should be understood that headings corresponding to one or more noun phrases 100 may be inserted into the document before associated paragraphs are positioned to provide additional context to the paragraphs and structure of the compiled document.

Figure 21:
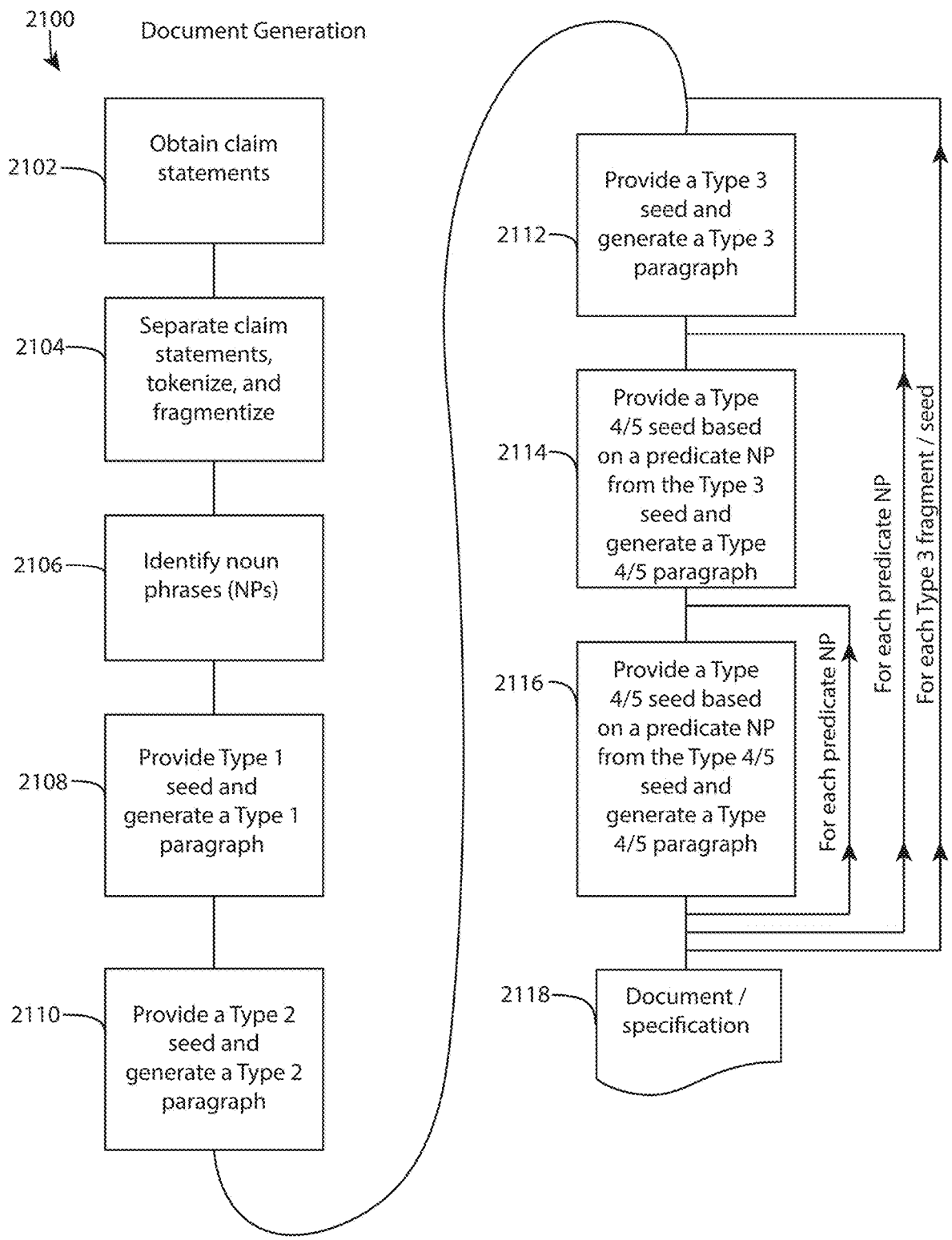
FIG. 21 depicts a method of generating a document according to one embodiment.

In the illustrated embodiment of FIG. 21, a method 2100 of compiling a document based on claim text with one or more head statements 50 and zero or more child statements 60 arranged in a tree structure is shown. Alternatively, the document may be compiled from a different type of text other than the claim text that is arranged in a different or similar type of tree structure, such as topic sentences and sub-topic sentences.

The method 2100 may involve obtaining the claim text, and one or more of tokenizing, POS tagging, parsing, and fragmentizing the claim text. Steps 2102, 2104. The noun phrases 100 of one or more statement fragments 102, categorized according to one embodiment of the present disclosure, may be identified. Step 2106.

The preamble fragment 110 of the claim text may be provided to the Model Type M1 to generate a Paragraph Type P1, and the aggregate fragment of the claim text may be provided to the Model Type M2 to generate a Paragraph Type P2. Steps 2108, 2110. These two paragraphs may provide general context to the subject matter of the claim text and outline the main components of the text, which may correspond to the base topic noun phrases 114.

The iterative process of generating paragraphs that expand on this subject matter according to the arrangement and association of the noun phrases 100 may be performed. The method 2100 may include providing a base fragment 120 as an input to the Model Type M3 to generate a Paragraph Type P3 related to the subject matter of the base fragment 120. Step 2112. For each predicate noun phrase 116 of the base fragment 120, a Paragraph Type P4 or a Paragraph Type P5 may be generated depending on whether the predicate noun phrase 116 corresponds to a feature topic noun phrase 132 of a feature fragment 130. Steps 2114, 2116.

If a predicate noun phrase 116 of the base fragment 120 corresponds to a feature fragment 130, each of the predicate noun phrases 116 of the feature fragment 130 may be processed to generate a Paragraph Type P4 or a Paragraph Type P5. As each paragraph type is generated it may be appended to the prior generated paragraph type so that the document is generated after each of the noun phrases 100 and associated statement fragment 102 have been provided as input to a model type to output a paragraph type. Step 2118. The document generated according to one embodiment herein may incorporate one or more pre-defined paragraphs or form paragraphs based on a template. Because statement fragments 102 input to a model may be separated from other statement fragments, providing individual paragraphs as output, it should be understood that the arrangement of paragraphs is not limited to the construction shown in the illustrated embodiment and that the paragraphs may be arranged differently depending on the application.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes may be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of generating a document that forms a basis for a patent specification to be submitted for examination by a patent searching authority, said method comprising:
  providing a plurality of input statements each defining a statement sequence of one or more tokens;
  vectorizing each of the one or more tokens to generate one or more token vectors such that each token is represented by a vector within a vector space; and
  generating a plurality of document tokens based on the one or more token vectors, the plurality of document tokens forming the document that is a basis for a patent specification to he submitted for examination by the patent searching authority, the plurality of document tokens including at least one token absent from the one or more tokens of the plurality of input statements, whereby the plurality of document tokens define a. document token sequence that is different from the plurality of statement sequences respectively defined by the plurality of input statements,
  wherein the plurality of input statements define a tree structure in which one or more dependent statements of the plurality of input statements refer back to a head statement of the plurality of input statements such that the one or more dependent statements incorporate substantially all content of the head statement, and
  wherein a first input statement of the plurality of input statements is the head statement, wherein a type of the plurality of document tokens are words such that the plurality of document tokens define at least a portion of a human readable sentence.

2. The method of claim 1 comprising:
  grouping each of the plurality of input statements into seed fragments; and
  identifying one or more phrases in the plurality of input statements, the one or more phrases defining phrase groups of the one or more tokens.

3. The method of claim 2 wherein the phrase groups are noun phrases.

4. The method of claim 2 comprising:
  identifying a first topic phrase group of a first seed fragment of the seed fragments, wherein the first seed fragment includes the first topic phrase group and at least one predicate phrase group;
  generating a first plurality of document tokens based on the first seed fragment of the seed fragments;
  identifying a first predicate phrase group from among the at least one predicate phrase group;
  selecting a second seed fragment of the seed fragments with a second topic phrase group that corresponds to the first predicate phrase group of the first seed fragment; and
  generating a second plurality of document tokens based on the second seed fragment.

5. The method of claim 4 wherein said generating includes joining the first plurality of document tokens with the second plurality of document tokens.

6. The method of claim 4 comprising identifying predicate-based seed fragments based on each of the at least one predicate phrase groups, and generating a plurality of predicate-based document tokens based on the predicate-based seed fragments.

7. The method of claim 6 comprising identifying secondary predicate-based seed fragments based on each of at least one secondary predicate phrase group of the predicate-based seed fragments, and generating a plurality of secondary predicate-based document tokens based on the secondary predicate-based seed fragments.

8. The method of claim 1 comprising providing a sequence generation model that generates the plurality of document tokens based on the one or more token vectors.

9. The method of claim 8 wherein said generating the plurality of document. tokens includes feeding a fixed-length seed sequence to the sequence generation model to generate a single output vector corresponding to the vector space, wherein the fixed-length seed sequence is a subset of the one or more token vectors.

10. The method of claim 9 further comprising generating the sequence generation model by identifying seed fragments from a plurality of seed documents and associating a plurality of target fragments obtained respectively from the plurality of seed documents.

11. The method of claim 1 wherein the plurality of document tokens are the same type of tokens as the one or more tokens of the plurality of input statements.

12. A document generation system for generating a document that forms a basis for a patent specification to be submitted for examination by a patent searching authority, said document generation system comprising:
  a memory to store a vector space translator and one or more sequence generation models, said vector space translator including vector information pertaining to a vector space for tokens;
  a controller configured to receive a plurality of input statements, each of the plurality of input statements defining a statement sequence of one or more tokens, wherein said controller is configured to:
  tokenize the plurality of input statements into one or more tokens representative of content of the plurality of input statements;
  vectorize, based on said vector information from said vector space translator stored in said memory, each of the one or more tokens to yield a token vector within said vector space for said each of the one or more tokens;
  arrange a sequence of token vectors obtained from at least one of the plurality of input statements;
  feed the sequence of token vectors to the one or more sequence gene ration models to generate a plurality of output vectors; and
  translate the plurality of output vectors, based on the vector information, to a plurality of output tokens that together form the document that provides a basis for a specification to be submitted for examination, the plurality of output tokens including at least one token absent from the one or more tokens of the plurality of input statements, whereby the plurality of output tokens define a document token sequence that is different from the plurality of statement sequences respectively defined by the plurality of input statements, wherein the plurality of input statements define a tree structure in which one or more dependent statements of the plurality of input statements refer back to a head statement of the plurality of input statements such that said one or more dependent statements incorporate substantially all content of the head statement, wherein the plurality of output tokens are the same type of tokens as the one or more tokens of the plurality of input statements, and wherein the type of tokens are words such that the plurality of output tokens define at least a portion of a human readable sentence.

13. The document generation system of claim 12 wherein the sequence of token vectors obtained from the at least one of the plurality of input statements is based on a subset of the one or more tokens associated with a corresponding one of the plurality of input statements, wherein the sequence of token vectors define a seed fragment.

14. The document generation system of claim 13 wherein a plurality of seed fragments is generated from the one or more tokens associated with the corresponding one of the plurality of input statements.

15. The document generation system of claim 13 wherein the controller is configured to identify one or more phrases in the plurality of input statements, the one or more phrases defining phrase groups of the one or more tokens that form a basis for the seed fragment.

16. The document generation system of claim 12 wherein the controller is configured to feed a fixed length seed sequence of vectors to the one or more sequence generation models to generate a single output vector corresponding to the vector space, wherein the fixed length seed sequence corresponds to a subset of said one or more tokens.

17. A system for generating a document that forms a basis for a patent specification to be submitted for examination by a patent searching authority, said system comprising:
   a processor;
   a memory coupled to the processor;
   a vector translator stored in the memory and executed by the processor to vectorize one or more tokens;
   a sequence generator stored in the memory and executed by the processor to generate one or more output vectors based on one or more input vectors;
   a control system including a seed statement receiver, the seed statement receiver receives an incoming statement, the incoming statement including a. statement sequence of one or more tokens, the control system including a content fragmenter and a document compiler;
   the control system operates to obtain one or more token vectors having a dimension M based on output from the vector translator;
   the content fragmenter of the control system generates a plurality of seed fragments from the incoming statement, each of the plurality of seed fragments including at least one token from among the one or more tokens of the incoming statement;
   the sequence generator generates one or more output vectors based on one or more input vectors, the one or more output vectors corresponding to one or more output tokens; and
   the document compiler of the control system coupled to the sequence generator, the document compiler of the control system provides to the sequence generator at least one token vector obtained from the vector translator with respect to the at least one token of at least one of the plurality of seed fragments, wherein the plurality of output tokens obtained based on output from the sequence generator include at least one token absent from the one or more tokens of the incoming statement, wherein the plurality of output tokens define a document token sequence that is different from the statement sequence of the incoming statement, the document compiler aggregates output from the sequence generator to form the document that provides a basis for a patent specification to be examined, wherein the incoming statement forms at least part of a tree structure that includes a head statement and one or more child statements that refer back to the head statement such that the one or more child statements incorporate substantially all content of the head statement, and wherein the incoming statement is the head statement, wherein a type of the plurality of output tokens are words such that the plurality of output tokens define at least a portion of a human readable sentence.

\* \* \* \* \*

UNITED STATES PATENT AND TRADEMARK OFFICE
CERTIFICATE OF CORRECTION

PATENT NO. : 10,776,566 B2
APPLICATION NO. : 15/987103
DATED : September 15, 2020
INVENTOR(S) : Nathan J. DeVries Page 1 of 1

It is certified that error appears in the above-identified patent and that said Letters Patent is hereby corrected as shown below:

In the Claims

Column 23, Line 26:
"specification to he submitted for examination by the"
Should be:
--specification to be submitted for examination by the--

Column 23, Line 30:
"whereby the plurality of document tokens define a."
Should be:
--whereby the plurality of document tokens define a--

Column 24, Line 25:
"The method of claim 9 further comprising generating"
Should be:
--The method of claim 8 further comprising generating--

Column 24, Line 56:
"sequence gene ration models to generate a plurality of"
Should be:
--sequence generation models to generate a plurality of--

Column 26, Line 3:
"ment, the incoming statement including a. statement"
Should be:
--ment, the incoming statement including a statement--

Signed and Sealed this
Third Day of November, 2020

Andrei Iancu
*Director of the United States Patent and Trademark Office*